United States Patent
Palanisamy et al.

(10) Patent No.: US 10,591,914 B2
(45) Date of Patent: Mar. 17, 2020

(54) SYSTEMS AND METHODS FOR AUTONOMOUS VEHICLE BEHAVIOR CONTROL

(71) Applicant: GM GLOBAL TECHNOLOGY OPERATIONS LLC, Detroit, MI (US)

(72) Inventors: Praveen Palanisamy, Sterling Heights, MI (US); Marcus J. Huber, Saline, MI (US); Upali P. Mudalige, Oakland Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 370 days.

(21) Appl. No.: 15/806,367

(22) Filed: Nov. 8, 2017

(65) Prior Publication Data
US 2019/0138004 A1    May 9, 2019

(51) Int. Cl.
   *G05D 1/00*      (2006.01)
   *G06N 99/00*    (2019.01)
   *G06N 20/00*    (2019.01)

(52) U.S. Cl.
   CPC .......... *G05D 1/0088* (2013.01); *G06N 20/00* (2019.01); *G05D 2201/0212* (2013.01); *G05D 2201/0213* (2013.01)

(58) Field of Classification Search
   CPC ......... G05D 1/0088; G05D 2201/0212; G05D 2201/0213; G06N 20/00
   USPC ........................................................ 701/27
   See application file for complete search history.

(56) References Cited

U.S. PATENT DOCUMENTS

| | | | |
|---|---|---|---|
| 8,140,658 B1 * | 3/2012 | Gelvin .................. | G06F 15/173 709/224 |
| 10,101,745 B1 * | 10/2018 | Sun ....................... | G06Q 10/047 |
| 10,496,098 B2 * | 12/2019 | Zhu ....................... | G05D 1/0088 |
| 2007/0093945 A1 * | 4/2007 | Grzywna ............... | G05D 1/101 701/23 |

(Continued)

FOREIGN PATENT DOCUMENTS

| | | | | |
|---|---|---|---|---|
| EP | 2363330 A2 * | 9/2011 | ............. | F16H 61/16 |
| JP | 4097158 B2 * | 6/2008 | | |

(Continued)

OTHER PUBLICATIONS

Bojarski, M., et al. "End to End Learning for Self-Driving Cars," arXiv:1604.07316v1 [cs.CV], Apr. 25, 2016, pp. 1-9.

(Continued)

*Primary Examiner* — Tuan C To
(74) *Attorney, Agent, or Firm* — Lorenz & Kopf, LLP

(57) ABSTRACT

Systems and methods are provided for controlling a vehicle. Control signals are generated at a high-level controller based on one or more sources of input data, comprising at least one of: sensors that provide sensor output information, map data and goals. The high-level controller comprises first controller modules comprising: an input processing module, a projection module, a memories module, a world model module, and a decision processing module that comprises a control model executor module. The control signals are processed at a low-level controller to generate commands that control a plurality of vehicle actuators of the vehicle in accordance with the control signals to execute one or more scheduled actions to be performed to automate driving tasks.

20 Claims, 11 Drawing Sheets

(56) References Cited

U.S. PATENT DOCUMENTS

| | | | | |
|---|---|---|---|---|
| 2007/0112700 A1* | 5/2007 | Den Haan | ............ | G05D 1/024 |
| | | | | 706/14 |
| 2008/0294309 A1* | 11/2008 | Kaprielian | ........... | A01B 69/008 |
| | | | | 701/27 |
| 2016/0232481 A1* | 8/2016 | Skaaksrud | ............. | H04L 67/12 |
| 2017/0137023 A1* | 5/2017 | Anderson | ......... | B60G 17/0195 |
| 2017/0191804 A1* | 7/2017 | Stark | .................. | F41H 13/0093 |
| 2017/0225795 A1* | 8/2017 | Lin | ........................ | H04W 8/26 |
| 2017/0242434 A1* | 8/2017 | Ewert | .................. | B60W 50/12 |
| 2018/0087907 A1* | 3/2018 | DeBitetto | .............. | G01S 19/46 |
| 2018/0259957 A1* | 9/2018 | Charrow | ............... | G08G 1/166 |

FOREIGN PATENT DOCUMENTS

| | | | |
|---|---|---|---|
| JP | 4432286 B2 | * | 3/2010 |
| KR | 100851120 B1 | * | 8/2008 |

OTHER PUBLICATIONS

Leonard, J., et al. "Team MIT Urban Challenge Technical Report," Computer Science and Artificial Intelligence Laboratory Technical Report, Apr. 13, 2007, CSAIL Publications.

Payton, D.W., et al. "An Architecture for Reflexive Autonomous Vehicle Control," IEEE International Conference onRobotics and Automation. Proceedings, 1986, pp. 1838-1845, vol. 3.

Reinholtz, C., et al. "DARPA Urban Challenge Technical Paper," 2007, pp. 1-25.

Urmson, C., et al., "Autonomous Driving in Urban Environments: Boss and the Urban Challenge," Journal of Field Robotics, 2008, pp. 425-466, vol. 25, No. 8.

* cited by examiner

| Essential Characteristics for Level 5 Automation | Implications on Paradigam | Enabler in the Paradigim |
|---|---|---|
| Human-like Behavior | Mimics Naturalistic Human-Like Behaviors | Everything |
| Exhaustive Domain Coverage | Provable State Space and Action Space Coverage | World Model, Projection and Decision Processing |
| Complex Reasoning | Provable State Space and Action Space Coverage | World Model, Projection and Decision Processing |
| Deliberative Through to Reactive | Solve Highly Complex Domain Problems While Obeying Real-Time Requirements | Symbolic and Sub-Symbolic Representations and Reasoning in Projections, World Model, and Memories, Real-Time Behavior Executor |
| Predictive | Supports Representing and Reasoning Over Future States and Actions | Projection Component |
| Learning | Adaptive Based on Experince | Active Learning in Potentially All of the Components |
| Decision Making Under Uncertainty | Capability to Deal with Incomplete and Uncertain Information | Sub-Symbolic and Learning Capabilities Across Components |
| Supports Validation | Explainable Outputs | Explicit Symbolic Representations |
| Easily Modifiable Domain Knowledge | Flexible Representation and Algorithms That do not Need Complete Retraining for Knowlege Addition | Explicit Symbolic Representations |

FIG. 12

SYSTEMS AND METHODS FOR AUTONOMOUS VEHICLE BEHAVIOR CONTROL

INTRODUCTION

The present disclosure generally relates to autonomous vehicles, and more particularly relates to systems and methods for autonomous vehicle behavior control.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Currently, there are many different approaches for autonomous vehicle control, but all suffer from drawbacks. Drawbacks of existing approaches include, but are not limited to, that they: are unable to form memories, are unable to use past experience to inform current decision-making, lack internal representation of the world (e.g., representations such as lane markings, traffic signs etc. are pre-programmed), and/or have limited episodic/working memory.

For example, model-driven approaches to autonomous vehicle control rely on the programmer's understanding of the driving behaviors and limits functionality. On the other hand, data-driven approaches to autonomous vehicle control are limited by their generalization capabilities which is proportional to the amount of data. Knowledge-based learning approaches (e.g., inductive, deductive learning approaches) for autonomous vehicle control share the limitations of data-driven approaches. Feed-back based learning approaches (e.g., supervised, semi-supervised learning approaches) for autonomous vehicle control require curated, labeled data. Unsupervised models for autonomous vehicle control use learning patterns without task specific knowledge/motivation. As such, there is currently no single approach that covers all of the characteristics needed for level five (L5) autonomous vehicle behavior control.

Accordingly, it is desirable to provide systems and methods for controlling autonomous vehicle behavior that can full automation without human control (e.g., level 5 automation). Furthermore, other desirable features and characteristics of the present disclosure will become apparent from the subsequent detailed description and the appended claims, taken in conjunction with the accompanying drawings and the foregoing technical field and background.

SUMMARY

Systems and method are provided for controlling a vehicle. In accordance with the method control signals are generated at a high-level controller based on one or more sources of input data, comprising at least one of: sensors that provide sensor output information, map data and goals. The high-level controller comprises first controller modules comprising: an input processing module, a projection module, a memories module, a world model module, and a decision processing module that comprises a control model executor module. The control signals are processed at a low-level controller to generate commands that control a plurality of vehicle actuators of the vehicle in accordance with the control signals to execute one or more scheduled actions to be performed to automate driving tasks.

In one embodiment, generating the control signals at a high-level controller comprises: generating, at the input processing module based on the input data, symbolic and sub-symbolic percepts; generating, at the memories module based on the symbolic and sub-symbolic percepts, memories data, state operations and first feedback information that is provided to each of the other first controller modules; generating, at the world model module based on the symbolic and sub-symbolic percepts, world state information that indicates state of other entities in an external environment of the vehicle and includes information regarding current attributes of objects in the external environment of the vehicle, and second feedback information that is provided to each of the other first controller modules; generating, at the decision processing module based on the symbolic and sub-symbolic percepts, queries, state operations, memory operations, a control model comprising control actions and constraints and third feedback information that is provided to each of the other first controller modules; processing, at the projection module, projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules; and generating the control signals at the control model executor module by executing the control model. The control signals specify control actions and parameters used to schedule the one or more scheduled actions to be performed to automate driving tasks.

In one embodiment, the input processing module generates the symbolic and sub-symbolic percepts by: processing first learning inputs to generate input transformation parameters, the first learning inputs comprising: the input data, the symbolic percepts, the sub-symbolic percepts, feedback information from each of the other first controller modules, and input processing control information from the decision processing module, wherein the input processing control information comprises commands and parameterization; sending the input transformation parameters to a symbolic percepts module of the input processing module and a sub-symbolic percepts module of the input processing module; processing, at the symbolic percepts module, the input data, the input transformation parameters, the input processing control information from the decision processing module, and feedback information from each of the other first controller modules to transform the input data into the symbolic percepts; and processing, at the sub-symbolic percepts module, the input data, the input transformation parameters, the input processing control information from the decision processing module, and feedback information from each of the other first controller modules to transform the input data into the sub-symbolic percepts. The symbolic percepts are symbolic representations comprising at least one of: labels, predicates, and logical expressions, and the sub-symbolic percepts are sub-symbolic representations comprising at least one of: probability distributions, activation levels, and confidence levels.

In one embodiment, the projection inputs comprise: the symbolic percepts and the sub-symbolic percepts from the input processing module, the memories data and the first feedback information from the memories module, the world state information and the second feedback information from the world model module, and the queries and the third feedback information from the decision processing module. The projection module can process the projection inputs by: performing, at a first symbolic module, symbolic projection processing to transform the projection inputs into symbolic representations and generate symbolic projections; performing, at a first sub-symbolic module, sub-symbolic projection processing to transform the projection inputs into sub-symbolic representations and generate sub-symbolic projections; integrating the symbolic projections and the sub-symbolic projections to generate the projections, the memory operations that are sent to the memories module to update the memories module, the state operations that are sent to the world model module to make revisions at the world model module, the projections that are sent to the decision processing module to make a behavior decision at the decision processing module, and the fourth feedback information. In addition, second learning inputs can be processed to generate projection transformation parameters that are used by the projection module to improve input/output of the projection module and functionality of each module of the projection module. The second learning inputs comprise: the symbolic percepts and the sub-symbolic percepts from the input processing module, the memories data from the memories module, the world state information from the world model module, the queries from the decision processing module, the symbolic projections from the first symbolic module, the sub-symbolic projections from the first sub-symbolic module, and the projections from the first integration module. Each of the memory operations comprises a command to either: query the memories module to read memories data from the memories module, write memories data to the memories module, delete memories data from the memories module, or modify memories data stored at the memories module. Each of the state operations comprises a command to either: query the world model module to read world state information from the world model module, write world state information to the world model module, delete world state information from the world model module, or modify world state information at the world model module. The projections provided to the decision processing module comprise at least one of: future predicted activity and state of other entities in the external environment of the vehicle.

In one embodiment, the memories module generates, based on the symbolic and sub-symbolic percepts, the memories data, the state operations and the first feedback information that is provided to each of the other first controller modules by: processing the symbolic percepts and the sub-symbolic percepts, the memory operations from the projection module, the world state information from the world model module, and the memory operations from the decision processing module to generate the memories data, the state operations and the first feedback information that is provided to each of the other first controller modules. The memories data comprises: historical information that captures historical data of potential importance. In addition, the memories data is sent to the projection module and the decision processing module, and the state operations are sent to the world model module.

In one embodiment, the memories module generates, based on the symbolic and sub-symbolic percepts, the memories data, the state operations and the first feedback information that is provided to each of the other first controller modules by: performing symbolic memory processing, at a second symbolic module, to transform memories input information into symbolic representations and generate symbolic memories, wherein the memories input information comprises: the symbolic percepts and the sub-symbolic percepts from the input processing module, the memory operations from the projection module, the world state information from the world model module, the memory operations from the decision processing module, and memory transformation parameters; performing sub-symbolic memory processing, at a second sub-symbolic module, to transform the memories input information into sub-symbolic representations and generate sub-symbolic memories; and integrating second integration inputs, at a second integration module, to generate the second feedback information, the memories data that are sent to the projection module, the state operations that are sent to the world model module, and the memories data that are sent to the decision processing module, wherein the second integration inputs comprise: the symbolic memories, the sub-symbolic memories, and the memory transformation parameters. In addition, the memory transformation parameters are generated at a second learning module based on third learning inputs that comprise: the symbolic memories, the sub-symbolic memories, the memory operations from the projection module, the world state information from the world model module, the memory operations from the decision processing module, and the memories data from the second integration module. The memory transformation parameters are sent to the second symbolic module and the second sub-symbolic module for processing to improve input/output of the memories module and functionality of each module of the memories module.

In one embodiment, the world model module generates, based on the symbolic and sub-symbolic percepts, the world state information, and the second feedback information that is provided to each of the other first controller modules by: processing world model input information to generate the: the second feedback information that is provided to each of the other first controller modules; and the world state information that is provided to the projection module, the memories module, and the decision processing module. The world model input information comprises: the symbolic percepts, the sub-symbolic percepts, and the state operations from the projection module, the memories module, and the decision processing module.

In one embodiment, the world model module generates, based on the symbolic and sub-symbolic percepts, the world state information, and the second feedback information that is provided to each of the other first controller modules by: performing symbolic world model processing, at a third symbolic module, to transform the world model input information into symbolic representations and generate symbolic world state information; performing sub-symbolic world model processing, at a third sub-symbolic module, to transform the world model input information into sub-symbolic representations and generate sub-symbolic world state information; and integrating, at a third integration module, the symbolic world state information and the sub-symbolic world state information to generate: the world state information, the second feedback information that is provided to each of the other first controller modules, and the world state information that is sent to the projection module, the memories module, and the decision processing module.

In one embodiment, the world model input information further comprises world model transformation parameters. In addition, a third learning module can generates, based on fourth learning inputs, the world model transformation parameters. The fourth learning inputs comprise: the symbolic percepts and the sub-symbolic percepts, the state operations from the projection module, the memories module, and the decision processing module, the symbolic world state information, the sub-symbolic world state information, and the world state information from the integration module. The world model transformation parameters are sent to the third symbolic module and the third sub-symbolic module for processing to improve input/output of the world model module and functionality of each module of the world model module.

In one embodiment, the decision processing module generates, based on the symbolic and sub-symbolic percepts, the queries, the state operations, the memory operations, the control model, and the third feedback information that is provided to each of the other first controller modules, by: processing decision processing inputs to determine a behavior decision that comprises the one or more scheduled actions to be performed to automate the driving tasks and generate the queries, the state operations, the memory operations, the control model, and the third feedback information that is provided to each of the other first controller modules. The decision processing inputs comprising: the symbolic percepts and the sub-symbolic percepts, the projection information from the projection module, the memories data from the memories module, and the world state information from the world model module.

In addition, the method further comprises: sending the queries to the projection module, sending the memory operations to the memories module, and sending the state operations to the world model module. Each query sent to the projection module comprises: a request for projection data from the projection module that is required to make the behavior decision. Each memory operation comprises a command to either: query the memories module to read memories data from the memories module that are required to make the behavior decision, write memories data to the memories module as required to make the behavior decision, delete memories data from the memories module as required to make the behavior decision, or modify memories data at the memories module as required to make the behavior decision. Each state operation comprises a command to either: query the world model module to read world state information from the world model module that is required to make the behavior decision, write world state information to the world model module that is required to make the behavior decision, delete world state information from the world model module as required to make the behavior decision, or modify world state information at the world model module as required to make the behavior decision.

In one embodiment, the decision processing module generates, based on the symbolic and sub-symbolic percepts, the queries, the state operations, the memory operations, the control model, and the third feedback information that is provided to each of the other first controller modules, by: performing symbolic decision-making processing, at a fourth symbolic module, to transform decision processing inputs into symbolic representations and generate symbolic decision-making processing results comprising one or more of actions, action parameters and constraints; performing sub-symbolic decision-making processing, at a fourth sub-symbolic module, to transform the decision processing inputs into sub-symbolic representations and generate sub-symbolic decision-making processing results comprising one or more of actions, action parameters and constraints, and integrating, at a fourth integration module, the symbolic decision-making processing results and the sub-symbolic decision-making processing results to generate: decision-processing results, wherein the decision-processing results comprise: the control model, the third feedback information that is provided to each of the other first controller modules, the queries that are sent to the projection module, the memory operations that are sent to the memories module, and the state operations that are sent to the world model module. The decision processing inputs comprise: the symbolic percepts and the sub-symbolic percepts from the input processing module, the projection information from the projection module, the memories data from the memories module, the world state information from the world model module, and decision processing transformation parameters.

In addition, the method further comprises: generating the decision processing transformation parameters, at a fourth learning module, based on fifth learning inputs comprising: the symbolic percepts and the sub-symbolic percepts from the input processing module, the projection information from the projection module, the memories data from the memories module, and the world state information from the world model module; and sending the decision processing transformation parameters to the fourth symbolic module and the fourth sub-symbolic module for processing to improve input/output of the decision processing module and functionality of each module of the decision processing module.

In one embodiment, the control model executor module generates, based on the control model provided from the decision processing module, the control signals that are provided to the low-level controller by: performing symbolic control model processing, at a fifth symbolic module, to transform the control model into symbolic representations and generate a symbolic control model that comprises a symbolic representation of the control actions and constraints; performing sub-symbolic control model processing, at a fifth sub-symbolic module, to transform the control model into sub-symbolic representations and generate a sub-symbolic control model that comprises a sub-symbolic representation of the control actions and constraints; and integrating, a fifth integration module, the symbolic control model and the sub-symbolic control model to generate the control signals that specify the control actions and parameters that are sent to the low-level controller, wherein the control actions and parameters provide for invocation of capabilities of the low-level controller to schedule the one or more scheduled actions to be performed to automate the driving tasks.

In addition, the method further comprises: generating control model transformation parameters, at a fifth learning module, based on sixth learning inputs comprising: the symbolic control model, the sub-symbolic control model, and the control signals from the fifth integration module; and sending the control model transformation parameters to the fifth symbolic module and the fifth sub-symbolic module for processing to improve input/output of the control model executor module and functionality of each module of the control model executor module.

In each case, feedback information sent to a particular first controller module by another first controller module comprises at least one of: information content related to a prior interaction with that particular first controller module that indicates appropriateness or inappropriateness of information received from that particular first controller module; and information regarding timeliness of the prior interaction with that particular first controller module. Feedback information comprises at least one of: a signal of positive reaction to a prior interaction with that particular first controller module that provides positive reinforcement information that influences adjustment of processing at that particular first controller module for processing to improve input/output and performance of that particular first controller module; and a signal of negative reaction to the prior interaction with that particular first controller module that provides negative reinforcement information that influences adjustment of processing at that particular first controller module for processing to improve input/output and performance of that particular first controller module.

In one embodiment, a vehicle control system is provided that comprises: one or more sources of input data, comprising at least one of: sensors that provide sensor output information, map data and goals; a low-level controller configured to process control signals to generate commands that control a plurality of vehicle actuators of a vehicle in accordance with the control signals to execute one or more scheduled actions to be performed to automate driving tasks; and a high-level controller comprising a plurality of first controller modules, and being configured to generate the control signals. The first controller modules of the high-level controller comprise: an input processing module that is configured to generate symbolic and sub-symbolic percepts based on the input data; a memories module that is configured to generate, based on the symbolic and sub-symbolic percepts, memories data, state operations and first feedback information that is provided to each of the other first controller modules; a world model module that is configured to generate, based on the symbolic and sub-symbolic percepts, world state information that indicates state of other entities in an external environment of the vehicle and includes information regarding current attributes of objects in the external environment of the vehicle, and second feedback information that is provided to each of the other first controller modules; and a decision processing module that is configured to generate, based on the symbolic and sub-symbolic percepts, queries, state operations, memory operations, a control model comprising control actions and constraints, and third feedback information that is provided to each of the other first controller modules; and a projection module that is configured to: process projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules. The decision processing module comprises: a control model executor module that is configured to: generate, by executing the control model, the control signals that are provided to the low-level controller, wherein the control signals specify control actions and parameters used to schedule the one or more scheduled actions to be performed to automate driving tasks.

In one embodiment, the input processing module comprises a symbolic percepts module that is configured to generate the symbolic percepts based on the input data and input transformation parameters, a sub-symbolic percepts module that is configured to generate the sub-symbolic percepts based on the input data and the input transformation parameters, and an input learning module. The symbolic percepts are symbolic representations comprising at least one of: labels, predicates, and logical expressions, whereas the sub-symbolic percepts are sub-symbolic representations comprising at least one of: probability distributions, activation levels, and confidence levels. The input learning module is configured to process first learning inputs to generate the input transformation parameters, and send the input transformation parameters to the symbolic percepts module and the sub-symbolic percepts module. The first learning inputs comprising: the input data, the symbolic percepts, the sub-symbolic percepts, feedback information from each of the other first controller modules, and input processing control information from the decision processing module, wherein the input processing control information comprises commands and parameterization. The input transform parameters are used by the symbolic percepts module and the sub-symbolic percepts module to transform the input data into the symbolic percepts and sub-symbolic percepts.

In one embodiment, the projection inputs comprise: the symbolic percepts and the sub-symbolic percepts from the input processing module, the memories data and the first feedback information from the memories module, the world state information and the second feedback information from the world model module, and the queries and the third feedback information from the decision processing module. In one embodiment, the projection module comprises a first symbolic module, a first sub-symbolic module, a first integration module, and a first learning module. The first symbolic module is configured to perform symbolic projection processing to transform the projection inputs into symbolic representations and generate symbolic projections, and the first sub-symbolic module is configured to: perform sub-symbolic projection processing to transform the projection inputs into sub-symbolic representations and generate sub-symbolic projections. The first integration module is configured to: receive first integration inputs comprising: the symbolic projections, the sub-symbolic projections; and integrate the symbolic projections and the sub-symbolic projections to generate: the projections, the memory operations that are sent to the memories module to update the memories module, the state operations that are sent to the world model module to make revisions at the world model module, the projections that are sent to the decision processing module to make a behavior decision at the decision processing module, and the fourth feedback information. The first learning module is configured to receive second learning inputs, generate projection transformation parameters based on one or more of the second learning inputs, and send the projection transformation parameters to the first symbolic module and the first sub-symbolic module for processing to improve input/output of the projection module and functionality of each module of the projection module. The second learning inputs comprise: the symbolic percepts and the sub-symbolic percepts from the input processing module, the memories data from the memories module, the world state information from the world model module, the queries from the decision processing module, the symbolic projections from the first symbolic module, the sub-symbolic projections from the first sub-symbolic module, and the projections from the first integration module.

In one embodiment, the memories module a second symbolic module, a second sub-symbolic module, a second integration module, and a second learning module. Memories input information comprises: the symbolic percepts and the sub-symbolic percepts from the input processing module, the memory operations from the projection module, the world state information from the world model module, the memory operations from the decision processing module, and memory transformation parameters. The second symbolic module is configured to receive memories input information, and perform symbolic memory processing to transform the memories input information into symbolic representations and generate symbolic memories. The second sub-symbolic module is configured to receive the memories input information, and perform sub-symbolic memory processing to transform the memories input information into sub-symbolic representations and generate sub-symbolic memories. The second integration module is configured to receive second integration inputs comprising the symbolic memories, the sub-symbolic memories, and memory transformation parameters; integrate the second integration inputs to generate the second feedback information, the memories data that are sent to the projection module, the state operations that are sent to the world model module, and the memories data that are sent to the decision processing module. The memories data comprises: historical information that captures historical data of potential importance. The second learning module is configured to: receive third learning inputs, and generate, based on one or more of the third learning inputs, the memory transformation parameters, and send the memory transformation parameters to the second symbolic module and the second sub-symbolic module for processing to improve input/output of the memories module and functionality of each module of the memories module. The third learning inputs comprise: the symbolic memories, the sub-symbolic memories, the memory operations from the projection module, the world state information from the world model module, the memory operations from the decision processing module, and the memories data from the second integration module.

In one embodiment, the world model module is further configured to: receive world model input information comprising: the symbolic percepts and the sub-symbolic percepts from the input processing module, and the state operations from the projection module, the memories module, and the decision processing module, and world model transformation parameters. In one embodiment, the world model module comprises a third symbolic module, a third sub-symbolic module, a third integration module, and a third learning module. The third symbolic module is configured to: perform symbolic world model processing to transform the world model input information into symbolic representations and generate symbolic world state information. The third sub-symbolic module is configured to: perform sub-symbolic world model processing to transform the world model input information into sub-symbolic representations and generate sub-symbolic world state information. The third integration module is configured to: receive third integration inputs comprising: the symbolic world state information from symbolic module, the sub-symbolic world state information from sub-symbolic module, and world model transformation parameters; and integrate the symbolic world state information and the sub-symbolic world state information to generate the world state information, the second feedback information, and the world state information that is sent to the projection module, the memories module, and the decision processing module. The third learning module is configured to: receive fourth learning inputs comprising: the symbolic percepts and the sub-symbolic percepts, the state operations from the projection module, the state operations from the memories module, the state operations from the decision processing module, the symbolic world state information from the third symbolic module, the sub-symbolic world state information from the third sub-symbolic module, and the world state information from the integration module; generate, based on the fourth learning inputs, world model transformation parameters; and send the world model transformation parameters to the third symbolic module and the third sub-symbolic module for processing to improve input/output of the world model module and functionality of each module of the world model module.

In one embodiment, the decision processing module is further configured to receive decision processing inputs comprising: the symbolic percepts and the sub-symbolic percepts from the input processing module, the projection information from the projection module, the memories data from the memories module, and the world state information from the world model module; process the decision processing inputs to determine a behavior decision that comprises the one or more scheduled actions to be performed to automate driving tasks and generate the queries, the state operations, the memory operations, the control model and the third feedback information that is provided to each of the other first controller modules; send the queries to the projection module, wherein each query sent to the projection module comprises a request for projection data from the projection module that is required to make the behavior decision; and send the memory operations to the memories module, wherein each memory operation comprises a command to either: query the memories module to read memories data from the memories module that are required to make the behavior decision, write memories data to the memories module as required to make the behavior decision, delete memories data from the memories module as required to make the behavior decision, or modify memories data at the memories module as required to make the behavior decision; and send the state operations to the world model module, wherein each state operation comprises a command to either: query the world model module to read world state information from the world model module that is required to make the behavior decision, write world state information to the world model module that is required to make the behavior decision, delete world state information from the world model module as required to make the behavior decision, or modify world state information at the world model module as required to make the behavior decision.

In one embodiment, the decision processing module comprises a fourth symbolic module, a fourth sub-symbolic module, a fourth integration module, and a fourth learning module. The fourth symbolic module is configured to: receive decision processing inputs comprising: the symbolic percepts and the sub-symbolic percepts from the input processing module, the projection information from the projection module, the memories data from the memories module, the world state information from the world model module, and decision processing transformation parameters; and perform symbolic decision-making processing to transform the decision processing inputs into symbolic representations and generate symbolic decision-making processing results, wherein the symbolic decision-making processing results comprise one or more of actions, action parameters and constraints. The fourth sub-symbolic module is configured to: perform sub-symbolic decision-making processing to transform the decision processing inputs into sub-symbolic representations and generate sub-symbolic decision-making processing results, wherein the sub-symbolic decision-making processing results comprise one or more of actions, action parameters and constraints. The fourth integration module is configured to: receive fourth integration inputs comprising: the symbolic decision-making processing results, the sub-symbolic decision-making processing results, and the decision processing transformation parameters; and integrate the symbolic decision-making processing results and the sub-symbolic decision-making processing results to generate: decision-processing results, wherein the decision-processing results comprise: the control model, the third feedback information, the queries that are sent to the projection module, the memory operations that are sent to the memories module, and the state operations that are sent to the world model module. The fourth learning module is configured to: receive fifth learning inputs comprising: the symbolic percepts and the sub-symbolic percepts from the input processing module, the projection information from the projection module, the memories data from the memories module, and the world state information from the world model module; generate, based on one or more of the fifth learning inputs, the decision processing transformation parameters; and send the decision processing transformation parameters to the fourth symbolic module and the fourth sub-symbolic module for processing to improve input/output of the decision processing module and functionality of each module of the decision processing module.

In one embodiment, the control model executor module comprises a fifth symbolic module, a fifth sub-symbolic module, a fifth integration module, and a fifth learning module. The fifth symbolic module is configured to perform symbolic control model processing to transform the control model input information into symbolic representations and generate a symbolic control model that comprises a symbolic representation of the control actions and constraints, and the fifth sub-symbolic module is configured to: perform sub-symbolic control model processing to transform the control model input information into sub-symbolic representations and generate a sub-symbolic control model that comprises a sub-symbolic representation of the control actions and constraints. The fifth integration module is configured to: integrate the symbolic control model and the sub-symbolic control model to generate of the control signals that specify the control actions and parameters that are sent to the low-level controller, wherein the control actions and parameters provide for invocation of capabilities of the low-level controller to schedule the one or more scheduled actions to be performed to automate the driving tasks. The fifth learning module is configured to: receive sixth learning inputs comprising: the symbolic control model, the sub-symbolic control model, and the control signals and from the fifth integration module; generate, based on the sixth learning inputs, control model transformation parameters; and send the control model transformation parameters to the fifth symbolic module and the fifth sub-symbolic module for processing to improve input/output of the control model executor module and functionality of each module of the control model executor module.

In one embodiment, the high-level controller configured to generate control signals that are used to generate commands that control a plurality of vehicle actuators of a vehicle to execute one or more scheduled actions to be performed to automate driving tasks. The high-level controller comprises a plurality of first controller modules that include: an input processing module that is configured to generate symbolic and sub-symbolic percepts based on one or more sources of input data, comprising at least one of: sensors that provide sensor output information, map data and goals; a memories module that is configured to generate, based on the symbolic and sub-symbolic percepts, memories data, state operations and first feedback information that is provided to each of the other first controller modules; a world model module that is configured to generate, based on the symbolic and sub-symbolic percepts, world state information that indicates state of other entities in an external environment of the vehicle and includes information regarding current attributes of objects in the external environment of the vehicle, and second feedback information that is provided to each of the other first controller modules; a decision processing module that is configured to generate, based on the symbolic and sub-symbolic percepts, queries, state operations, memory operations, a control model comprising control actions and constraints, and third feedback information that is provided to each of the other first controller modules; a projection module that is configured to: process projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules. The decision processing module comprises a control model executor module that is configured to: generate, by executing the control model, the control signals, wherein the control signals specify control actions and parameters used to schedule the one or more scheduled actions to be performed to automate driving tasks.

BRIEF DESCRIPTION OF THE DRAWINGS

The exemplary embodiments will hereinafter be described in conjunction with the following drawing figures, wherein like numerals denote like elements, and wherein:

FIG. 12 is a table that explains how modules of the control system provides various characteristics needed for Level 5 automation.

DETAILED DESCRIPTION

The following detailed description is merely exemplary in nature and is not intended to limit the application and uses.

Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
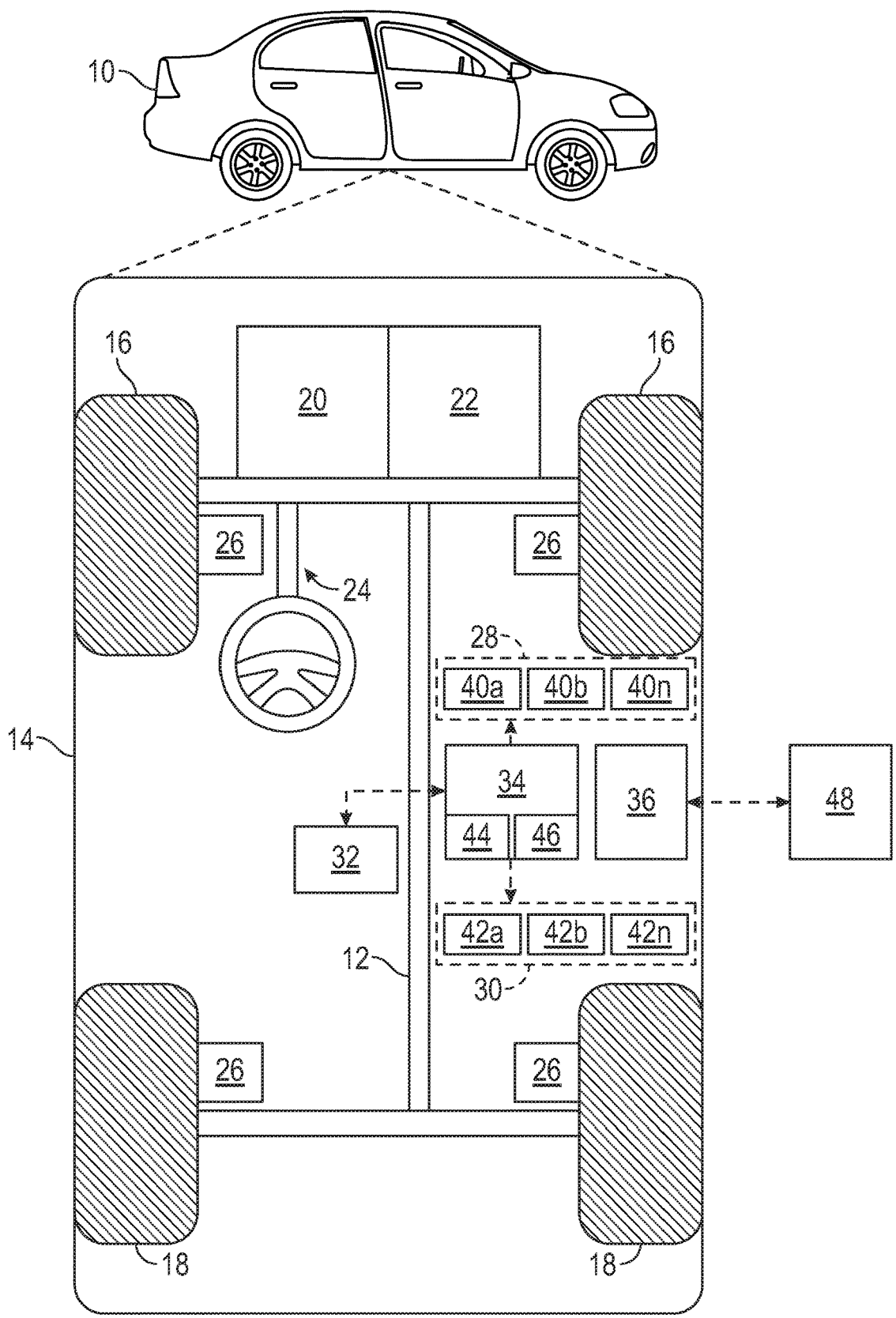
FIG. 1 is a functional block diagram illustrating an autonomous vehicle in accordance with various embodiments.

FIG. 1 is a functional block diagram illustrating an autonomous vehicle 10 in accordance with various embodiments. The vehicle includes components for implementing a control system that intelligently controls the vehicle 10 using a hybrid paradigm that intelligently combines heuristic, symbolic, connectionist and cognitive artificial intelligence (AI) technologies with rule-based procedural logic to enable behavioral decision-making and solve complex autonomous vehicle driving tasks in real-time in a way that covers the entire autonomous driving operation space.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the control system is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, inertial measurement units, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

Figure 2:
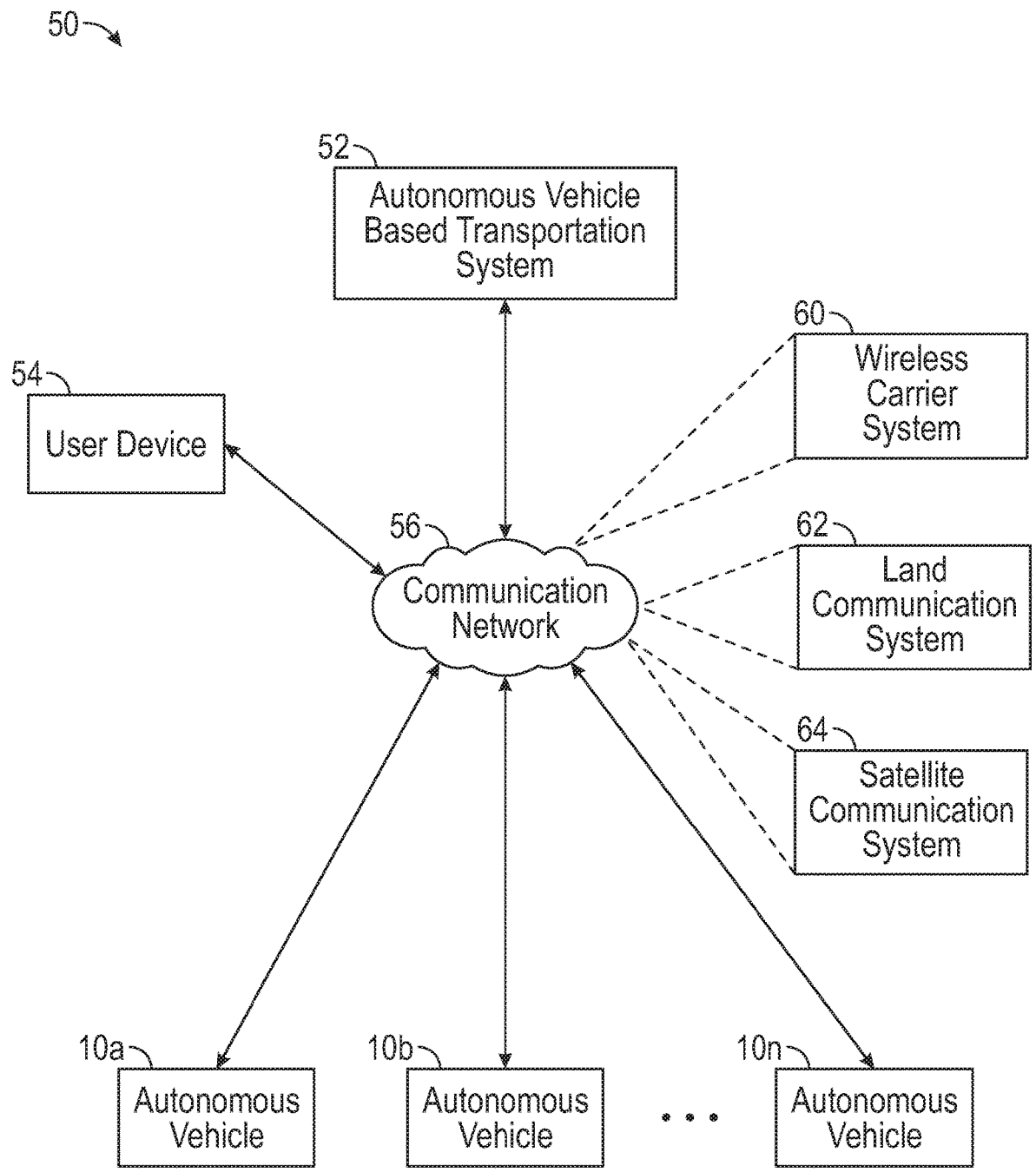
FIG. 2 is a functional block diagram illustrating a transportation system having one or more autonomous vehicles of FIG. 1 in accordance with various embodiments.

The communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as will be described in greater detail below with reference to FIGS. 4-12, the controller 34 can include a high-level controller generates control signals based on input data that are provided to a low-level controller that processes the control signals to generate commands that control the various actuators (e.g., lateral and longitudinal controllers such as: automatic steering controls, automatic acceleration control, automatic braking controls) of the actuator system 30 to execute one or more scheduled actions to be performed to automate driving tasks.

In various embodiments, one or more instructions of the controller 34 are embodied in the control system and, when executed by the processor 44, intelligently combine symbolic, connectionist and cognitive technologies with rule-based procedural logic to enable behavioral decision-making and solve complex vehicle driving tasks in real-time.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10*a*-10*n* as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10*a*-10*n*. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
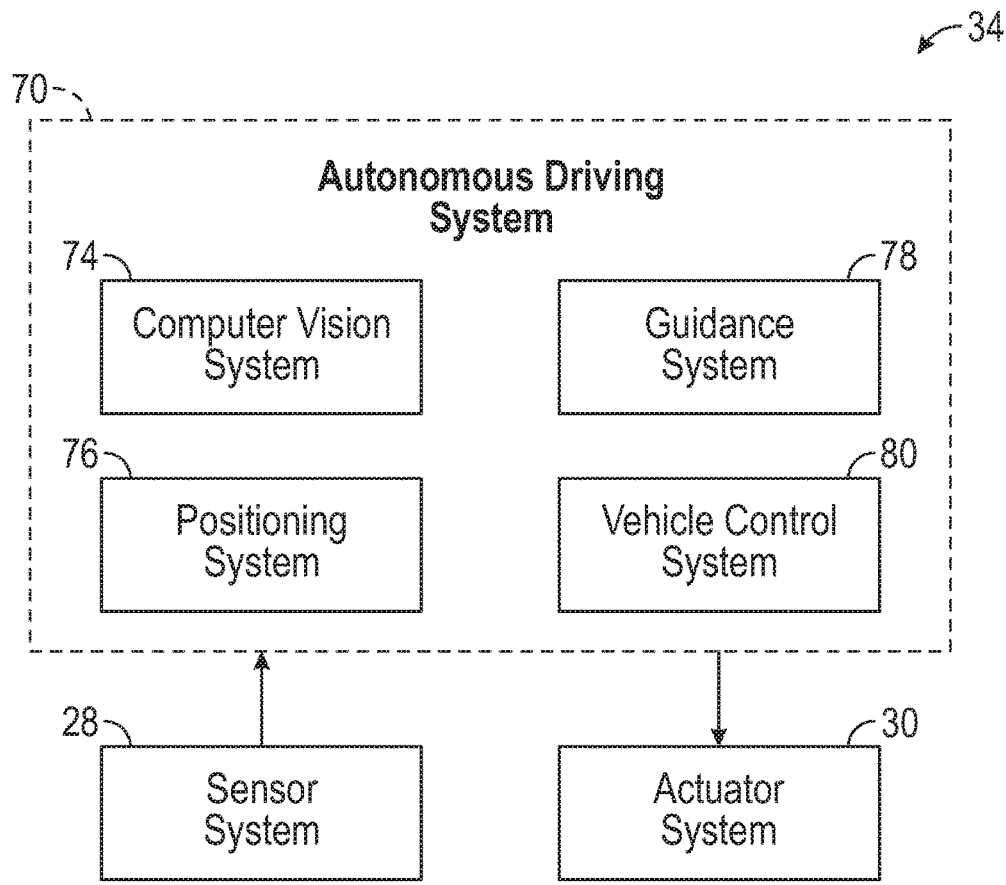
FIG. 3 is a functional block diagram illustrating an autonomous driving system (ADS) in accordance with various embodiments.

In accordance with various embodiments, the controller 34 implements an autonomous driving system (ADS) 70 as shown in FIG. 3. That is, suitable software and/or hardware components of the controller 34 (e.g., the processor 44 and the computer-readable storage device 46) are utilized to provide an autonomous driving system 70 that is used in conjunction with vehicle 10.

In various embodiments, the instructions of the autonomous driving system 70 may be organized by function, module, or system. For example, as shown in FIG. 3, the autonomous driving system 70 can include a computer vision system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the computer vision system 74 synthesizes and processes sensor data and predicts the presence, location, classification, and/or path of objects and features of the environment of the vehicle 10. In various embodiments, the computer vision system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

Figure 4:
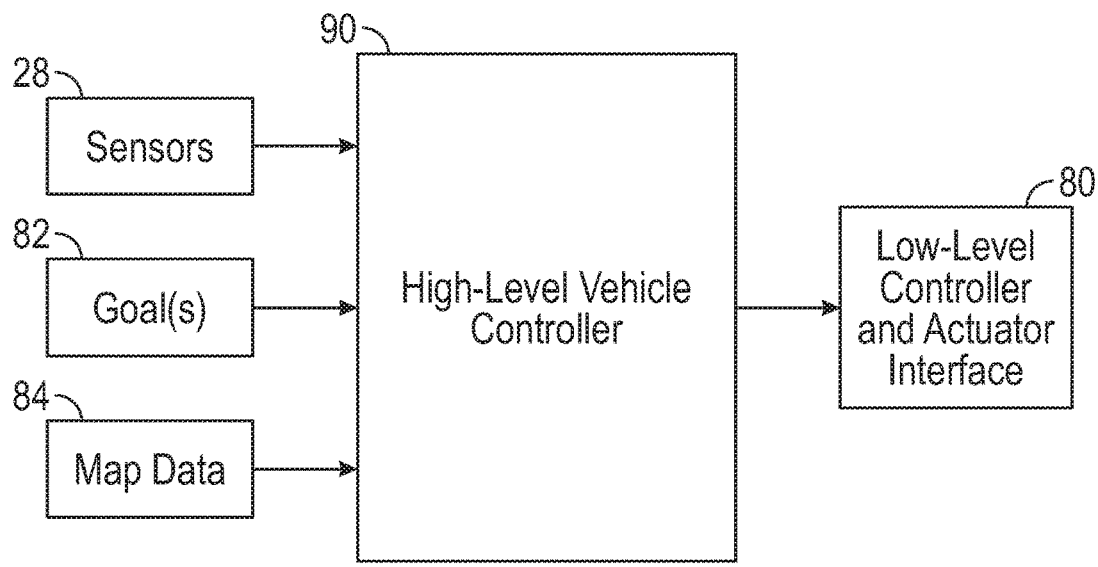
FIG. 4 is a block diagram that illustrates a vehicle control system in accordance with various embodiments.
Figure 5:
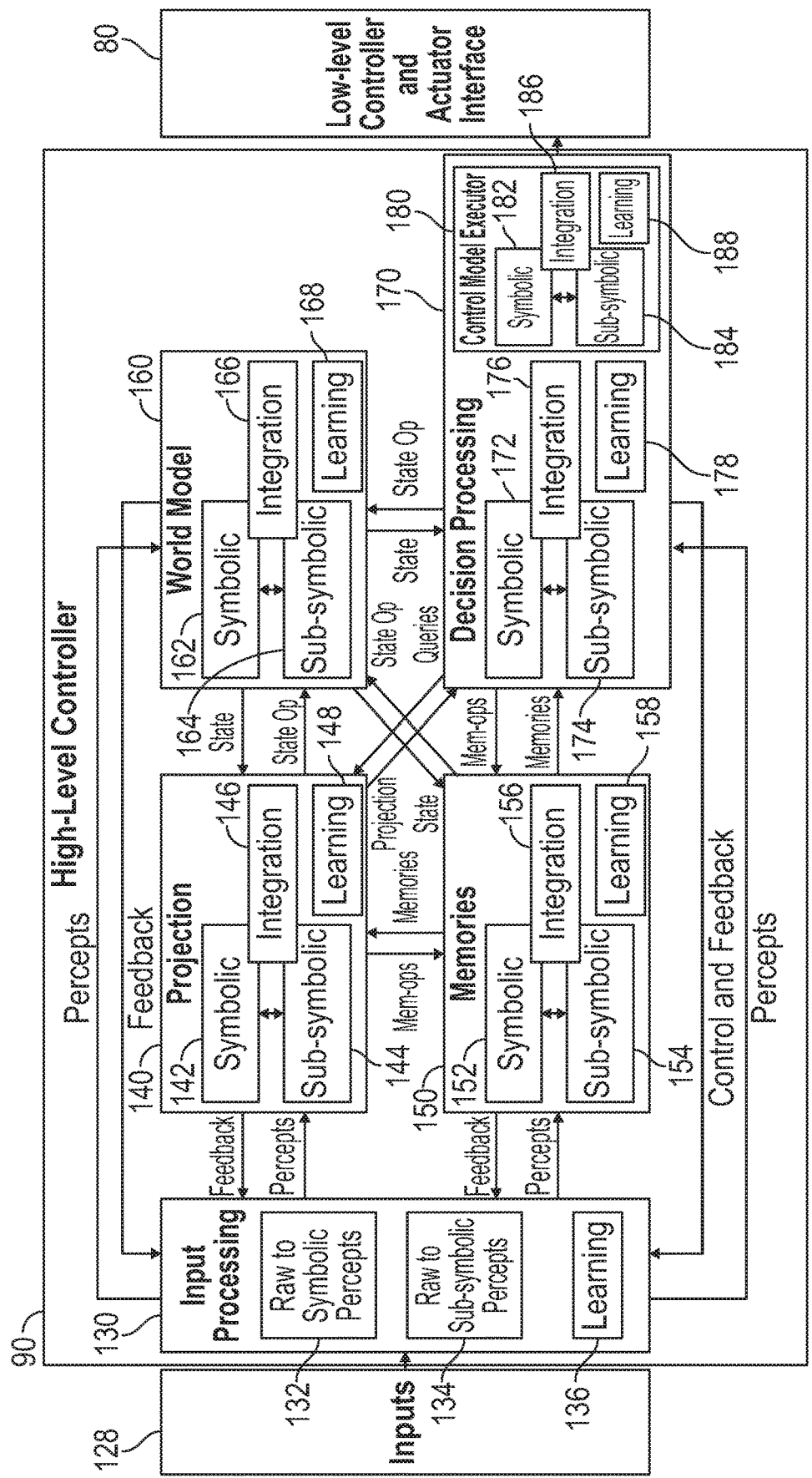
FIG. 5 is a block diagram that illustrates further details of the high-level controller of FIG. 4 in accordance with various embodiments.

In accordance with the disclosed embodiments, features of the ADS 70 and its vehicle control system 80 can be implemented using a vehicle control system 100 as shown in FIGS. 4 and 5, which will now be described with continued reference to FIGS. 1-3.

FIG. 4 is a block diagram that illustrates a vehicle control system 100 in accordance with various embodiments. The vehicle control system 100 includes various sources 28, 82, 84 of input data that can be processed by a high-level controller 90 (also referred to herein as a behavior controller 90) to generate control signals that are provided to a low-level controller 80. The control signals specify control actions and parameters to schedule scheduled actions to be performed to automate driving tasks. The low-level controller 80 processes the control signals to generate commands that control various actuators (in accordance with the control signals) to execute one or more scheduled actions to be performed to automate driving tasks. The low-level controller 80 can in turn control various actuators (not illustrated in FIG. 4) of a vehicle, such as an autonomous vehicle. As such, the low-level controller 80 can also be referred to as an actuator controller and interface 80 herein.

In this particular example, the various sources 28, 82, 84 of input data can include, but are not limited to, various sensors 28, goals 82, and map data 84. In one implementation, the sensors 28 can include, but are not limited to, cameras, LIDAR systems, RADAR systems, etc. In general, the term "goals" refers to the tasks that the system is required to accomplish. In one implementation, the goals 82 can include, but are not limited to, driving passengers to a destination, maintaining minimum safety thresholds, and maximizing passenger comfort. In general, the term "map data" refers to drivable spaces and annotations associated with the drivable spaces such as connections between drivable spaces, road signs, flow restrictions, and speed limits. In one implementation, the map data 84 can include, but are not limited to, road lanes, lane widths, speed limits, traffic signals, pedestrian crossings, intersections, etc.

The low-level controller 80 processes control signals from the high-level controller 90 and generates commands to control various actuators in the vehicle. The various actuators can include any known actuators used in vehicles including, but not limited to, lateral and longitudinal controllers such as: automatic steering controls, automatic acceleration control, automatic braking controls, and any other controllers and actuators needed to automate all driving tasks.

FIG. 5 is a block diagram that illustrates further details of the high-level controller 90 of FIG. 4 in accordance with various embodiments. FIG. 5 will be described below with continued reference to FIG. 4.

The high-level controller 90 receives input data 128 from various sources (including sensors 28, goals 82 and map data 84 described above with reference to FIG. 4), and processes it to generate control signals at based on input data. In accordance with the disclosed embodiments, the high-level controller 90 includes a number of modules including an input module 130, a projection module 140, a memories module 150, a world model module 160, and a decision processing module 170 that includes a control model executor module 180 that provides control signals to the low-level controller 80. The control signals specify control actions and parameters to schedule the one or more scheduled actions to be performed to automate driving tasks. The low-level controller 80 processes the control signals to generate commands that control the vehicle actuators (not shown in FIG. 5) in accordance with the control signals to execute one or more scheduled actions to be performed to automate driving tasks.

As will be explained in greater detail below, each of the modules has symbolic and sub-symbolic processing capability, can integrate various inputs including symbolic and sub-symbolic representations, and can perform learning. Each of the modules exchange information with each other, generate information used to control the vehicle and provide feedback information to each other.

Prior to describing FIG. 5 further, it should be noted that the description of FIG. 5 will refer to various types of information that are shared between the input processing module 130, the projection module 140, the memories module 150, the world model module 160, and the decision processing module 170. These various types of information are illustrated in FIG. 5 using arrows that connect one of the above modules 130, 140, 150, 160, 170 to another one of the above modules 130, 140, 150, 160, 170. These different types of information are referred to and labeled as percepts, feedback, memories (or memories data), state (or world state information), projection(s), memory operation(s), state operation(s), and queries. With respect to memories, state, projection(s), memory operation(s), state operation(s), and queries, it should be appreciated that each of these types of information can also include "feedback information" (also referred to as feedback) even though it is not explicitly mentioned in the description in all cases for sake of clarity and simplicity. For instance, while the description may state that projection module 140 receives "memories from the memories module 150," it should be understood that this can mean that projection module 140 receives "memories and feedback information from the memories module 150." Likewise, as another example, while the description may state that projection module 140 receives "state from the world model module 160," it should be understood that this can mean that projection module 140 receives "state and feedback information from the world model module 160." Similarly, as yet another example, while the description may state that projection module 140 receives "queries from the decision processing module 170," it should be understood that this can be mean that projection module 140 receives "queries and feedback information from the decision processing module 170."

In general, feedback information can be or relate to positive or negative reinforcement information that is provided from one entity to another entity (e.g., from one module to another first controller module, from one sub-module to another sub-module of the same module, from one sub-module to another sub-module of another first controller module, from one module to another sub-module of another first controller module, etc.) to influence the other entity to adjust processing and I/O to improve performance.

Feedback information sent to a particular first controller module of the high-level controller 90 by another first controller module of the high-level controller 90 comprises at least one of: information content related to a prior interaction with that particular first controller module that indicates appropriateness or inappropriateness of information received from that particular first controller module, (e.g., missing data, abstraction level, uncertainty level, etc.), and/or information regarding timeliness (timing, frequency, etc.) of the prior interaction with that particular first controller module. For example, feedback can be specific to a particular aspect of the behavior or information from the other module such as information content (e.g., missing data, abstraction level, uncertainty level, etc.) and/or timeliness (timing, frequency, etc.).

In one embodiment, feedback can be a simple signal of positive or negative reaction to prior interaction with the module being sent the feedback. For example, in one embodiment, the feedback information is either a signal of positive reaction to a prior interaction with that particular first controller module that provides positive reinforcement information that influences adjustment of processing at that particular first controller module for processing to improve input/output and performance of that particular first controller module; or a signal of negative reaction to the prior interaction with that particular first controller module that provides negative reinforcement information that influences adjustment of processing at that particular first controller module for processing to improve input/output and performance of that particular first controller module.

Referring again to FIG. 5, the input processing module 130 receives input data and information 128, feedback information from the projection module 140, the memories module 150, the world model module 160, and the decision processing module 170, and input processing control information from control model executor module 180. As will be described in greater detail below, the input processing module 130 transforms the input information into symbolic and sub-symbolic representations referred to herein as symbolic and sub-symbolic percepts. Symbolic percepts (or information) can include, for example, labels, predicates, and logical expressions, etc. Sub-symbolic percepts (or information) can include, for example, probability distributions, activation levels, and confidence levels, etc. The input processing module 130 provides the symbolic percepts (from module 132) and sub-symbolic percepts (from module 134) to the projection module 140, the memories module 150, the world model module 160, and the decision processing module 170. As will also be described below, the input processing module 130 also learns how to perform and improve this transformation and the module's I/O. For example, the input processing module 130 also learns how to improve the module's I/O operations including what to send, where to send, when to send, how often to send, what parts of which inputs to process, etc.

The input processing module 130 includes various sub-modules 132, 134, 136, 138. The symbolic percepts module 132 receives input information 128, and transform parameters from the learning module 136. The symbolic percepts module 132 transforms or translates the input information 128 and/or transform parameters from the learning module 136 into the symbolic representations or percepts, and provides the symbolic percepts to the projection module 140, the memories module 150, the world model module 160, and the decision processing module 170, and the learning module 136.

The sub-symbolic percepts module 134 receives input information 128, and transform parameters from the learning module 136. The sub-symbolic percepts module 134 transforms the input information 128 and/or transform parameters from the learning module 136 into the sub-symbolic representations or percepts, and provides the sub-symbolic percepts to the projection module 140, the memories module 150, the world model module 160, and the decision processing module 170, and the learning module 136.

The learning module 136 receives input data and information 128 including raw sensor inputs and other inputs, the symbolic percepts from the symbolic percepts module 132, the sub-symbolic percepts from the sub-symbolic percepts module 134, and feedback information from the projection module 140, the memories module 150, the world model module 160, and the decision processing module 170, and input processing control information from control model executor module 180. Although not illustrated in FIG. 5 due to space constraints, it should be appreciated that the input processing module 130 can include data storage (not shown) that is associated with the input processing module 130. The data storage (not shown) that is associated with the input processing module 130 can be used to locally store transformation parameters or information that is generated/produced by the input processing module 130 so that the locally stored transformation parameters or information can be accessed and used by the learning module 136 of the input processing module 100, and/or provided to any other modules 140, 150, 160, 170, 180 as feedback. In addition, the learning module 136 can also receive and/or store any information that is generated at the modules that make up the module 130 at the data storage (e.g., the symbolic percepts from symbolic module 132, sub-symbolic percepts from sub-symbolic module 134).

The learning module 136 can process any of these sources of input information, and/or the locally stored information, to perform various learning functions and generate transformation parameters. The learning module 136 provides the transformation parameters to the symbolic percepts module 132 and the sub-symbolic percepts module 134. The transform parameters are parameters used by the symbolic percepts module 132 and the sub-symbolic percepts module 134 that transform inputs to symbolic and sub-symbolic percepts (or representations), and thus improve the I/O and functionality of the input processing module 130.

The projection module 140 receives input information including: symbolic percepts and sub-symbolic percepts from the input processing module 130, memories data from the memories module 150, state from the world model module 160, and queries from the decision processing module 170. The projection module 140 processes the input information to generate projections (e.g., hypothesis of the future activity and state of other entities in the world) based on the input information, and responds to queries regarding these projections. "Other entities in the world" can refer to any physical thing in the external environment. Examples of other entities in the world can include, but are not limited to, pedestrians, other vehicles, road signs, static objects on the road, etc. The projection module 140 also learns how to perform and improve these functions. For example, the projection module 140 can generate feedback information that it provides to the input processing module 130, memory operations that it provides to the memories module 150, state operations that it provides to the world model module 160, and projections that it provides to the decision processing module 170. The feedback information provided to the input processing module 130 can include indications of the appropriateness or inappropriateness of the output information (symbolic percepts and sub-symbolic percepts) and/or timing from the input processing module 130. The memory operations provided to the memories module 150 can include commands such as querying the memories module to read memories data from the memories module, writing memories data to the memories module, deleting memories data from the memories module, or modifying memories data stored at the memories module. The state operations provided to the world model module 160 can include commands such as querying the world model module to read world state information from the world model module, writing world state information to the world model module, deleting world state information from the world model module, or modifying world state information at the world model module. The projections provided to the decision processing module 170 can include future predicted activity and state of other entities in the world/environment.

The projection module 140 includes a symbolic module 142, a sub-symbolic module 144, integration module 146 and a learning module 148.

The symbolic module 142 receives input information including symbolic percepts and sub-symbolic percepts from the input processing module 130, memories data from the memories module 150, state from the world model module 160, queries from the decision processing module 170, and projection parameters from the learning module 148. The symbolic module 142 transforms the input information into symbolic representations and performs symbolic projection processing to generate symbolic projections that it provides to the integration module 146 and the learning module 148.

The sub-symbolic module 144 also receives input information including symbolic percepts and sub-symbolic percepts from the input processing module 130, memories data from the memories module 150, state from the world model module 160, queries from the decision processing module 170, and projection parameters from the learning module 148. The sub-symbolic module 144 transforms the input information into sub-symbolic representations and performs sub-symbolic projection processing to generate sub-symbolic projections that it provides to the integration module 146 and the learning module 148.

The integration module 146 receives the symbolic projections from symbolic module 142, the sub-symbolic projections from sub-symbolic module 144, and projection parameterization from the learning module 148. The integration module 146 integrates the symbolic projections from symbolic module 142 and the sub-symbolic projections from the sub-symbolic module 144 to generate projections that it sends to the learning module 148, feedback information that it sends to the input processing module 130, memory operations that it sends to the memories module 150, state operations that it sends to the world model module 160, and projections that it sends to the decision processing module 170.

The learning module 148 receives symbolic percepts and sub-symbolic percepts from the input processing module 130, memories data from the memories module 150, state from the world model module 160, queries from the decision processing module 170, symbolic projections from symbolic module 142, sub-symbolic projections from sub-symbolic module 144, and projections from the integration module 146. Although not illustrated in FIG. 5 due to space constraints, it should be appreciated that the projection module 140 can include data storage (not shown) that is associated with the projection module 140. The data storage (not shown) that is associated with the projection module 140 can be used to locally store projection parameters or information that is generated/produced by the projection module 140 so that the locally stored projection parameters or information can be accessed and used by the learning module 148 of the projection module 140, and/or provided to any other modules 130, 150, 160, 170, 180 as feedback. In addition, the learning module 148 can also receive and/or store any information that is generated at the modules that make up the projection module 140 at the data storage (e.g., the symbolic projections from symbolic module 142, sub-symbolic projections from sub-symbolic module 144, and projections from the integration module 146, and any feedback information provided by any of these modules 142, 144, 146 to other modules 130, 150, 160, 170, 180).

Based on any of these sources of input information, and/or the locally stored information, the learning module 148 can generate projection parameters that are used by the other modules 142, 144, 146 that are responsible for creating and integrating symbolic and sub-symbolic projection representations. More specifically, the learning module 148 can provide these projection parameters to symbolic module 142, sub-symbolic module 144, and the integration module 146 to improve the I/O of the projection module 140 (e.g., what to send, where to send, when to send, how often to send, what parts of which inputs to process, etc.), and other functionality (or functional competency) of each module of the projection module 140.

The memories module 150 receives as input information: symbolic percepts and sub-symbolic percepts from the input processing module 130, memory operations from the projection module 140, state from the world model module 160, and memory operations from the decision processing module 170. The memories module 150 stores memories data (e.g., historical information that captures historical data of potential importance), and performs operations such as adding, removing, deleting, and querying this information. The memories module 150 processes the input information and generates output information including: feedback information that is provided to the input processing module 130, memories data that are provided to the projection module 140; state operations that are provided to the world model module 160; and memories data that are provided to the decision processing module 170. The feedback information provides an indication of the appropriateness or inappropriateness of the information and/or timing. The memories data include contemporaneous information to be stored for future reference. The state operations include commands such as writing/adding, deleting/removing, updating/modifying, or querying/reading. The learning module 158 of the memories module 150 learns how to perform and improve the functions performed by the various sub-blocks 152, 154, 156 of the memories module 150.

The symbolic module 152 receives input information including symbolic percepts and sub-symbolic percepts from the input processing module 130, memory operations from the projection module 140, state from the world model module 160, memory operations from the decision processing module 170, and memory parameters from the learning module 158. The symbolic module 152 transforms the input information into symbolic representations and performs symbolic memory processing to generate symbolic memories that it provides to the integration module 156 and the learning module 158.

The sub-symbolic module 154 also receives input information including symbolic percepts and sub-symbolic percepts from the input processing module 130, memory operations from the projection module 140, state from the world model module 160, memory operations from the decision processing module 170, and memory parameters from the learning module 158. The sub-symbolic module 154 transforms the input information into sub-symbolic representations and performs sub-symbolic memory processing to generate sub-symbolic memories that it provides to the integration module 156 and the learning module 158.

The integration module 156 receives the symbolic memories from symbolic module 152, the sub-symbolic memories from sub-symbolic module 154, and memory parameters from the learning module 158. The integration module 156 integrates the symbolic memories from symbolic module 152 and the sub-symbolic memories from the sub-symbolic module 154 to generate memories data that it sends to the learning module 158, feedback information that it sends to the input processing module 130, memories data that it sends to the projection module 140, state operations that it sends to the world model module 160, and memories data that it sends to the decision processing module 170.

The learning module 158 receives symbolic percepts and sub-symbolic percepts from the input processing module 130, memory operations from the projection module 140, state from the world model module 160, memory operations from the decision processing module 170, symbolic memories from symbolic module 152, sub-symbolic memories from sub-symbolic module 154, and memories data from the integration module 156. Although not illustrated in FIG. 5 due to space constraints, it should be appreciated that the memories module 150 can include data storage (not shown) that is associated with the memories module 150. The data storage (not shown) that is associated with the memories module 150 can be used to locally store memory parameters or information that is generated/produced by that the memories module 150 so that the locally stored memory parameters or information can be accessed and used by the learning module 158 of the memories module 150, and/or provided to any other modules 130, 140, 160, 170, 180 as feedback. In addition, the learning module 158 can also receive and/or store any information that is generated at the modules that make up the memories module 150 at the data storage (e.g., the symbolic memories from symbolic module 152, sub-symbolic memories from sub-symbolic module 154, and memories data from the integration module 156, and any feedback information provided by any of these modules 152, 154, 156 to other modules 130, 140, 160, 170, 180).

Based on any of these sources of input information, and/or locally stored information, the learning module 158 can generate memory parameters that are used by the other modules 152, 154, 156 that are responsible for creating and integrating symbolic and sub-symbolic memory representations. More specifically, the learning module 158 can provide these memory parameters to symbolic module 152, sub-symbolic module 154, and the integration module 156 to improve the I/O of the memories module 150 (e.g., what to send, where to send, when to send, how often to send, what parts of which inputs to process, etc.) and other functionality (or functional competency) of each module of the memories module 150.

The world model module 160 receives input information including: symbolic percepts and sub-symbolic percepts from the input processing module 130, state operations from the projection module 140, state operations from the memories module 150, and state operations from the decision processing module 170. The world model module 160 stores a heterogeneous set of data types that are exposed to the other modules 130, 140, 150, 170. For example, the world model module 160 stores domain information such as state, behavior models, and meta-parameters, and performs operations such as adding, removing, deleting, and querying this information. The world model module 160 processes the input information and generates output information including: feedback information that is provided to the input processing module 130; state that is provided to the projection module 140; state that is provided to the memories module 150; and state that is provided to the decision processing module 170. The feedback information provides an indication of the appropriateness or inappropriateness of the information and/or timing. World state information indicates state of other entities in an external environment of the vehicle and includes information regarding current attributes of objects in the external environment of the vehicle and information regarding aspects of the external environment. The learning module 168 of the world model module 160 learns how to perform and improve the functions performed by the various sub-blocks 162, 164, 166 of the world model module 160.

The world model module 160 includes a symbolic module 162, a sub-symbolic module 164, and integration module 166 and a learning module 168.

The symbolic module 162 receives input information including symbolic percepts and sub-symbolic percepts from the input processing module 130, state operations from the memories module 150, state operations from the decision processing module 170, and world model parameters from the learning module 168. The symbolic module 162 transforms the input information into symbolic representations and performs symbolic world model processing to generate symbolic world state information that it provides to the integration module 166 and the learning module 168. In general, symbolic world model processing can include, for example, operations such as adding, removing, and modifying symbolic representations. More specific examples of symbolic world model processing can include, for example, operations such as transforming numeric information into symbols (e.g., a numeric distance input into "near", "medium", "far" symbols), summarizing probabilistic distributions into Boolean expressions (e.g., a probabilistic distribution over threat level into "vehicle_is_safe=True"), truth maintenance, logical inference, and other functions.

The sub-symbolic module 164 also receives input information including symbolic percepts and sub-symbolic percepts from the input processing module 130, state operations from the 140, state operations from the state operations module 150, state operations from the decision processing module 170, and world model parameters from the learning module 168. The sub-symbolic module 164 transforms the input information into sub-symbolic representations and performs sub-symbolic world model processing to generate sub-symbolic world state information that it provides to the integration module 166 and the learning module 168. Sub-symbolic world model processing can include, for example, operations such as adding, removing, and modifying sub-symbolic representations. More specific examples of symbolic world model processing can include, for example, operations such as incorporating symbolic information into probabilistic models (e.g., through Bayesian updating), updating neural networks with portions of the input information data, and other functions.

The integration module 166 receives the symbolic world state information from symbolic module 162, the sub-symbolic world state information from sub-symbolic module 164, and world model parameters from the learning module 168. The integration module 166 integrates the symbolic world state information from symbolic module 162 and the sub-symbolic world state information from the sub-symbolic module 164 to generate world state information that it sends to the learning module 168, feedback information that it sends to the input processing module 130, state that it sends to the projection module 140, state that it sends to the memories module 150, and state that it sends to the decision processing module 170.

The learning module 168 receives symbolic percepts and sub-symbolic percepts from the input processing module 130, state operations from the projection module 140, state operations from the memories module 150, state operations from the decision processing module 170, symbolic world state information from symbolic module 162, sub-symbolic world state information from sub-symbolic module 164, and world state information from the integration module 166. Although not illustrated in FIG. 5 due to space constraints, it should be appreciated that the world model module 160 can include data storage (not shown) that is associated with the world model module 160. The data storage (not shown) that is associated with the world model module 160 can be used to locally store world state information/information that is generated/produced by that the world model module 160 so that the locally stored world state information/information can be accessed and used by the learning module 168 of the world model module 160, and/or provided to any other modules 130, 140, 150, 170, 180 as feedback. In addition, the learning module 168 can also receive and/or store any information that is generated at the modules that make up the world model module 160 at the data storage (e.g., the symbolic world state information from symbolic module 162, sub-symbolic world state information from sub-symbolic module 164, and world state information, feedback information, and state from the integration module 166, and any feedback information provided by any of these modules 162, 164, 166 to other modules 130, 140, 150, 170, 180).

Based on any of these sources of input information, and/or locally stored information, the learning module 168 can generate and provide world model parameters to symbolic module 162, sub-symbolic module 164, and the integration module 166 to improve the I/O of the world model module 160 (e.g., what to send, where to send, when to send, how often to send, what parts of which inputs to process, etc.) and other functionality (or functional competency) of each module of the world model module 160.

The decision processing module 170 receives input information including: symbolic percepts and sub-symbolic percepts from the input processing module 130, projection information from the projection module 140, memories data from the memories module 150, and state from the world model module 160. The decision processing module 170 processes this input information and determines the action or actions to be performed based on the input information. The decision processing module 170 generates outputs including: input processing control information (e.g., commands and parameterization) that it provides to the input processing module 130, queries that it provides to the projection module 140, memory operations that it provides to the memories module 150, and state operations that it provides to the world model module 160. The queries are requests for information. The memory operations are commands such as querying the memories module to read memories data from the memories module, writing memories data to the memories module, deleting memories data from the memories module, or modifying memories data stored at the memories module. The state operations are commands such as querying the world model module to read world state information from the world model module, writing world state information to the world model module, deleting world state information from the world model module, or modifying world state information at the world model module. The learning module 178 of the decision processing module 170 learns how to perform and improve these functions.

The decision processing module 170 includes a symbolic module 172, a sub-symbolic module 174, and integration module 176 and a learning module 178.

The symbolic module 172 receives input information including: symbolic percepts and sub-symbolic percepts from the input processing module 130, projection information from the projection module 140, memories data from the memories module 150, state from the world model module 160, and decision processing parameters from the learning module 178. The symbolic module 172 transforms the input information into symbolic representations and performs symbolic decision-making processing to generate symbolic decision-making processing results that it provides to the integration module 176 and the learning module 178. The symbolic decision-making processing results include symbolic representations of decision processing representations (e.g., actions, action parameters and constraints).

The sub-symbolic module 174 also receives input information including: symbolic percepts and sub-symbolic percepts from the input processing module 130, projection information from the projection module 140, memories data from the memories module 150, state from the world model module 160, and decision processing parameters from the learning module 178. The sub-symbolic module 174 transforms the input information into sub-symbolic representations and performs sub-symbolic decision-making processing to generate sub-symbolic decision-making processing results that it provides to the integration module 176 and the learning module 178. The sub-symbolic decision-making processing results include sub-symbolic representations of decision processing representations (e.g., actions, action parameters and constraints).

The integration module 176 receives the symbolic decision-making processing results from symbolic module 172, the sub-symbolic decision-making processing results from sub-symbolic module 174, and decision processing parameters from the learning module 178. The integration module 176 integrates the symbolic decision-making processing results from symbolic module 172 and the sub-symbolic decision-making processing results from the sub-symbolic module 174 to generate decision-processing results that it sends to the learning module 178, control and feedback information that it sends to the input processing module 130, queries that it sends to the projection module 140, memory operations that it sends to the memories module 150, state operations that it sends to the world model module 160.

The learning module 178 receives symbolic percepts and sub-symbolic percepts from the input processing module 130, projection information from the projection module 140, memories data from the memories module 150, and state from the world model module 160. Although not illustrated in FIG. 5 due to space constraints, it should be appreciated that the decision processing module 170 can include data storage (not shown) that is associated with module 170. The data storage (not shown) that is associated with the decision processing module 170 can be used to locally store decision processing data/information that is generated/produced by the decision processing module 170 so that the locally stored decision processing data/information can be accessed and used by the learning module 178 of module 170, and/or provided to any other modules 130, 140, 150, 160, 180 as feedback. In addition, the learning module 178 can also receive and/or store any information that is generated at the modules that make up the decision processing module 170 (e.g., the symbolic decision-making processing results from symbolic module 172, sub-symbolic decision-making processing results from sub-symbolic module 174, and decision-making processing results from the integration module 176, and any feedback information provided by any of these modules 172, 174, 176 to other modules 130, 140, 150, 160, 180).

Based on any of these sources of input information, and/or locally stored information, the learning module 178 can generate decision processing parameters that are used by the other modules 172, 174, 176 that are responsible for creating and integrating symbolic and sub-symbolic decision processing representations. More specifically, the learning module 178 can provide these projection parameters to symbolic module 172, sub-symbolic module 174, and the integration module 176 to improve the I/O of the decision processing module 170 (e.g., what to send, where to send, when to send, how often to send, what parts of which inputs to process, etc.) and other functionality (or functional competency) of each module of the decision processing module 170.

The control model executor module 180 is a sub-module of the decision processing module 170. The control model executor module 180 receives control and parameterization from the integration module 176. Based on the control and parameterization information, the control model executor module 180 executes the scheduled system action or actions, and also learns how to perform and improve this function. The control model executor module 180 generates, based on the control and parameterization information, feedback information that is provided to the decision processing module 170. This feedback information provides an indication of the execution status of the control model(s) being executed.

The control model executor module 180 includes a symbolic module 182, a sub-symbolic module 184, and integration module 186 and a learning module 188.

The symbolic module 182 receives input information including control and parameterization from the integration module 176. The symbolic module 182 transforms the input information into symbolic representations and performs symbolic control model processing to generate a symbolic control model that it provides to the integration module 186 and the learning module 188. The symbolic control model is a symbolic representation of control actions and constraints.

The sub-symbolic module 184 also receives input information including control and parameterization from the integration module 176. The sub-symbolic module 184 transforms the input information into sub-symbolic representations and performs sub-symbolic control model processing to generate a sub-symbolic control model that it provides to the integration module 186 and the learning module 188. The sub-symbolic control model is a sub-symbolic representation of control actions and constraints.

The integration module 186 receives the symbolic control model from symbolic module 182, the sub-symbolic control model from sub-symbolic module 184, and integrates the symbolic control model from symbolic module 182 and the sub-symbolic control model from the sub-symbolic module 184 to generate control signals (e.g., that specify the control actions and parameters) that it sends to the low-level controller 80. The control actions and parameters provide for invocation of capabilities of the low-level controller 80.

The learning module 188 receives input information including control and parameterization from the integration module 176. Although not illustrated in FIG. 5 due to space constraints, it should be appreciated that the control model executor module 180 can include data storage (not shown) that is associated with the control model executor module 180. The data storage (not shown) that is associated with control model executor module 180 can be used to locally store control model data/information that is generated/produced by control model executor module 180 so that the locally stored control model data/information can be accessed and used by the learning module 188 of the control model executor module 180, and/or provided to any other modules 130, 140, 150, 160, 180 as feedback. In addition, the learning module 188 can also receive and/or store any information that is generated at the modules that make up the control model executor module 180 (e.g., the symbolic control model from symbolic module 182, sub-symbolic control model from sub-symbolic module 184, and control actions and parameters from the integration module 186, and any feedback information provided by any of these modules 182, 184, 186 to other modules 130, 140 150, 160, 170).

Based on any of these sources of input information, and/or locally stored information, the learning module 188 can generate control model parameters that are used by the other modules 182, 184, 186 that are responsible for creating and integrating symbolic and sub-symbolic control model execution representations. More specifically, the learning module 188 can provide these control model parameters to symbolic module 182, sub-symbolic module 184, and the integration module 186 to improve the I/O of the control model executor module 180 (e.g., what to send, where to send, when to send, how often to send, what parts of which inputs to process, etc.) and other functionality (or functional competency) of each module of the control model executor module 180.

Various functions and processing performed by the input processing module 130, the projection module 140, the memories module 150, the world model module 160, the decision processing module 170 and the control model executor module 180 will now be described below with reference to FIGS. 6-11. FIGS. 6-11 will be described below with continued reference to FIGS. 4 and 5.

Figure 6:
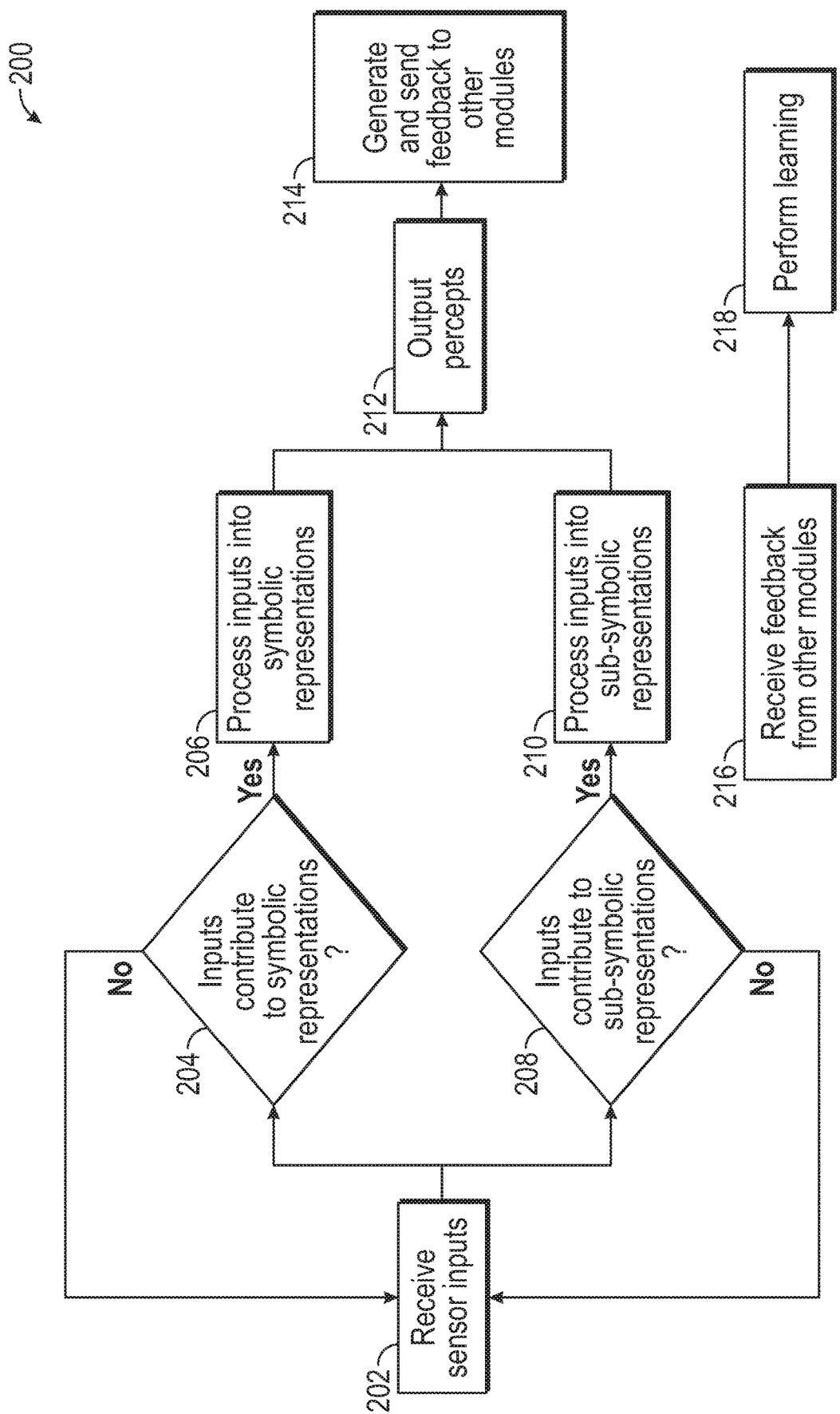
FIG. 6 is a flowchart that shows a control method performed by the input processing module of FIG. 5 in accordance with various embodiments.

FIG. 6 is a flowchart that shows a control method 200 performed by the input processing module 130 of FIG. 5 in accordance with various embodiments. FIG. 6 will be described with continued reference to FIGS. 1-5. As can be appreciated in light of the disclosure, the order of operation within the method 200 is not limited to the sequential execution as illustrated in FIG. 6, but may be performed in one or more varying orders as applicable and in accordance with various embodiments. In various embodiments, the method 200 can be scheduled to run based on one or more predetermined events, and/or can run continuously during operation of the autonomous vehicle 10. In addition, it is also noted that although steps 202-214 and 216-218 are shown in two separate paths, it should be appreciated that steps 202-214 and 216-218 can be performed simultaneously or in parallel.

The method 200 begins at 202 when the input processing module 130 receives input data and information 128 (e.g., sensor data).

At 204, the input processing module 130 provides the input data and information 128 and/or the transform parameters (from the learning module 136) to the symbolic percepts module 132, which determines (at 204) whether the input information 128 and/or the transform parameters contribute to symbolic representations. When the input information 128 and/or the transform parameters do not contribute to symbolic representations, the method 200 loops back to 202, where the input processing module 130 waits for the next cycle of input information 128 and/or the transform parameters to be received. When the input information 128 and/or the transform parameters do contribute to symbolic representations, the method 200 proceeds to 206, where the symbolic percepts module 132 transforms or translates the input information 128 and/or transform parameters into the symbolic representations or percepts, and then outputs (at 212) the symbolic percepts to the projection module 140, the memories module 150, the world model module 160, the decision processing module 170, and the learning module 136. As described above, the symbolic percepts can include, for example, labels, predicates, and logical expressions, etc.

Similarly, at 208, the input processing module 130 provides the input information 128 and/or the transform parameters (from the learning module 136) to the sub-symbolic percepts module 134, which determines (at 208) whether the input information 128 and/or the transform parameters contribute to sub-symbolic representations. When the input information 128 and/or the transform parameters do not contribute to sub-symbolic representations, the method 200 loops back to 202, where the input processing module 130 waits for the next cycle of input information 128 and/or the transform parameters to be received. When the input information 128 and/or the transform parameters do contribute to sub-symbolic representations, the method 200 proceeds to 210, where the sub-symbolic percepts module 134 transforms or translates the input information 128 and/or transform parameters into the sub-symbolic representations or percepts, and then outputs (at 212) the sub-symbolic percepts to the projection module 140, the memories module 150, the world model module 160, the decision processing module 170, and the learning module 136. As described above, the sub-symbolic percepts can include, for example, probability distributions, activation levels, and confidence levels, etc.

At 214, the input processing module 130 also generates and provides feedback information to the projection module 140, the memories module 150, the world model module 160, the decision processing module 170, and the learning module 136. In addition, as noted above, this feedback information from the input processing module 130 can be generated by any of the sub-modules 132, 134, 136, and also stored at the input processing module 130 for use by any of the sub-modules 132, 134, 136 of the input processing module 130.

At 216, the input processing module 130 also continuously receives input data and information 128 including raw sensor inputs and other inputs, feedback information from the projection module 140, the memories module 150, the world model module 160, and the decision processing module 170, and input processing control information from the decision processing module 170. Some or all of this information can be stored within data storage that is associated with the input processing module 130, along with the symbolic percepts from the symbolic percepts module 132 and the sub-symbolic percepts from the sub-symbolic percepts module 134, so that the locally stored transformation parameters or information can be accessed and used by the learning module 136 of the input processing module 100, and/or provided to any other modules 140, 150, 160, 170, 180 as feedback.

At 218, the learning module 136 of the input processing module 130 can process any of these sources of input information, the locally stored information, and/or the feedback information to perform various learning functions and generate transformation parameters (e.g., learns how to perform and improve transformations and the module's I/O). For example, the input processing module 130 also learns how to improve the module's I/O operations including what to send, where to send, when to send, how often to send, what parts of which inputs to process, etc. In addition, the learning module 136 can also provide the transformation parameters to the symbolic percepts module 132 and the sub-symbolic percepts module 134 so that the symbolic percepts module 132 and the sub-symbolic percepts module 134 can use the transformation parameters to transform inputs into symbolic and sub-symbolic percepts (or representations), and thus improve the I/O and functionality of the input processing module 130.

Figure 7:
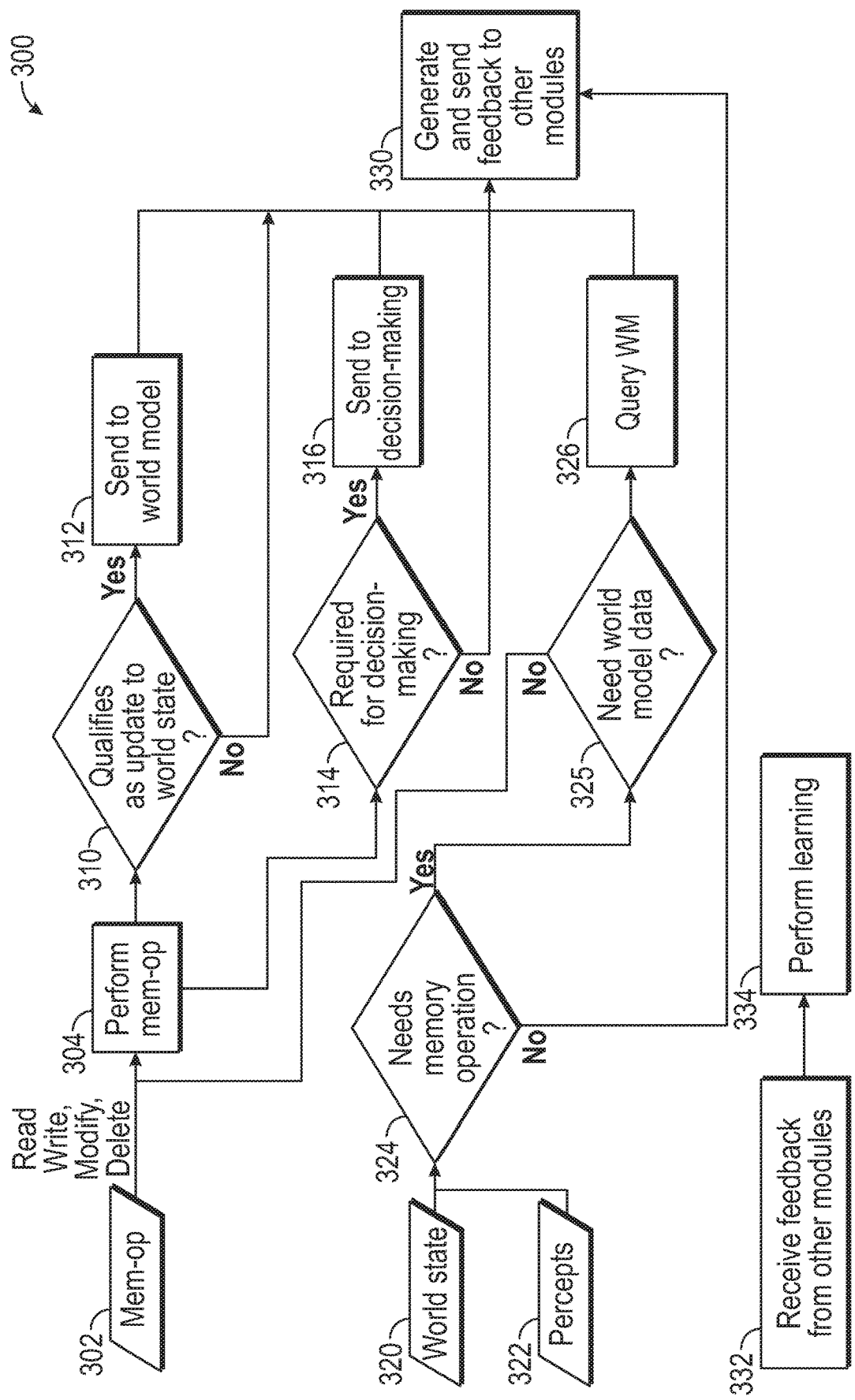
FIG. 7 is a flowchart that shows a method performed by the memories module of FIG. 5 in accordance with various embodiments.

FIG. 7 is a flowchart that shows a method 300 performed by the memories module 150 of FIG. 5 in accordance with various embodiments. FIG. 7 will be described with continued reference to FIGS. 1-5. As can be appreciated in light of the disclosure, the order of operation within the method 300 is not limited to the sequential execution as illustrated in FIG. 7, but may be performed in one or more varying orders as applicable and in accordance with various embodiments. In various embodiments, the method 300 can be scheduled to run based on one or more predetermined events, and/or can run continuously during operation of the autonomous vehicle 10. In addition, it is also noted that although steps 304-330 and 332-334 are shown in two separate paths, it should be appreciated that steps 304-330 and 332-334 can be performed simultaneously or in parallel. In general terms, steps 312, 316, 326 are performed to obtain information and fill in information gaps that the memories module 150 needs to perform processing tasks such as those described above.

The method 300 begins at 304 when the memories module 150 performs the memory operation based on an instruction 302 to perform a memory operation (e.g., read, write, modify, delete) that is issued from the projection module 140, the world model module 160, or the decision processing module 170.

At 310, the memories module 150 determines whether the memory operation (performed at 304) qualifies as an update to world state, and if so, the memories module 150 sends the state operation to the world model module 160 (at 312), and the method 300 then proceeds to 330. Processing performed by the world model module 160 based on the state operation will be described below with reference to FIG. 8.

At 314, the memories module 150 determines whether there is a need to make a decision based on the memory operation (performed at 304), and if so, the memories module 150 sends the memories data to the decision processing module 170 (at 316), and the method 300 then proceeds to 330. Processing performed by the decision processing module 170 based on the memories data will be described below with reference to FIG. 10.

At 324, the memories module 150 performs processing based on world state information 320 that is received from world model module 160 and percepts 322 that are received from the input processing module 130. For example, the memories module 150 can determine if a memory operation is needed. If a memory operation is not needed (at 324), the method proceeds to 330.

When it is determined, at 324, that a memory operation is needed, the method 300 then proceeds to 325, where the memories module 150 determines whether more world state information is required from world model module 160, and if so, the method proceeds to 326, where the memories module 150 queries the world model module 160 for more world state information, and the method 300 then proceeds to 330. Processing performed by the world model module 160 based on the query for more world state information will be described below with reference to FIG. 8. By contrast, if more world state information is not required at 325, the method 300 loops back to 304.

At 330, the memories module 150 analyzes information provided from the input processing module 130, the projection module 140, the world model module 160, and the decision processing module 170, and can the generate and send feedback information to the other modules (e.g., the input processing module 130, the projection module 140, the world model module 160, the decision processing module 170, and other sub-modules (e.g. the learning module 158)) as appropriate. In addition, as noted above, this feedback information from the memories module 150 can be generated by any of the sub-modules 152, 154, 156, and also stored at the memories module 150 for use by any of the sub-modules 152, 154, 156, 158 of the memories module 150.

At 332, the memories module 150 also receives feedback information from the other modules 130, 140, 160, 170, 180, and processes it (possibly along with other input information) via the learning module 158 (at 334) to perform learning as described above. For example, in one embodiment, at 334, the learning module 158 of the memories module 150 can process any sources of input information, locally stored information, and/or the feedback information to perform various learning functions and generate transformation parameters (e.g., learns how to perform and improve transformations and the module's I/O). For example, the learning module 158 learns how to improve the module's I/O operations including what to send, where to send, when to send, how often to send, what parts of which inputs to process, etc. In addition, the learning module 158 can also provide the transformation parameters to the symbolic percepts module 152 and the sub-symbolic percepts module 154 so that the symbolic percepts module 152 and the sub-symbolic percepts module 154 can use the transformation parameters to transform inputs into symbolic and sub-symbolic percepts (or representations), and thus improve the I/O and functionality of the memories module 150.

Figure 8:
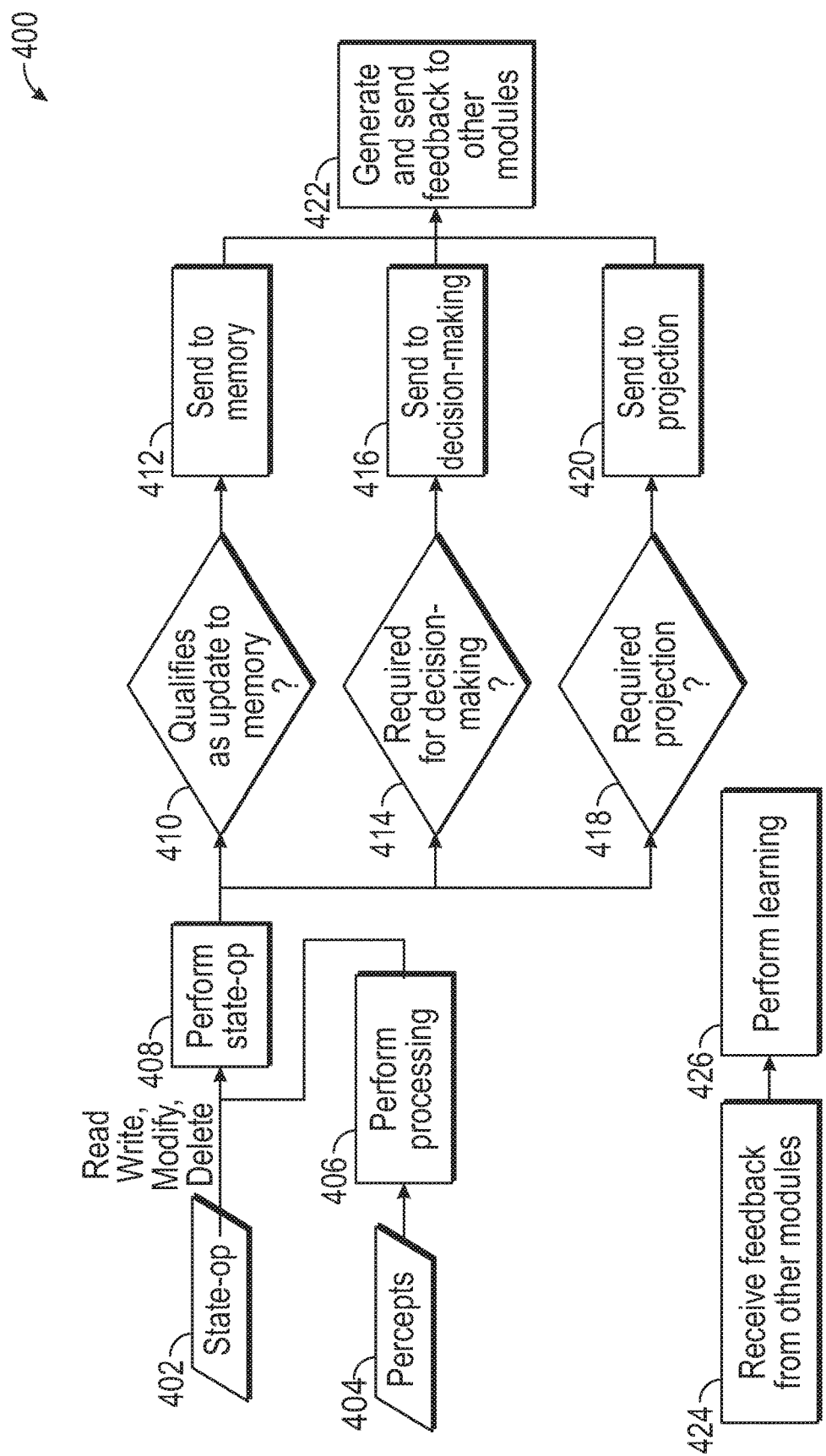
FIG. 8 is a flowchart that shows a method performed by the world model module of FIG. 5 in accordance with various embodiments.

FIG. 8 is a flowchart that shows a method 400 performed by the world model module 160 in accordance with various embodiments. FIG. 8 will be described with continued reference to FIGS. 1-5. As can be appreciated in light of the disclosure, the order of operation within the method 400 is not limited to the sequential execution as illustrated in FIG. 8, but may be performed in one or more varying orders as applicable and in accordance with various embodiments. In various embodiments, the method 400 can be scheduled to run based on one or more predetermined events, and/or can run continuously during operation of the autonomous vehicle 10. In addition, it is also noted that although steps 406-422 and 424-426 are shown in two separate paths, it should be appreciated that steps 406-422 and 424-426 can be performed simultaneously or in parallel. In general terms, steps 412, 416, 420 are performed to obtain information and fill in information gaps that the world model module 160 needs to perform processing tasks such as those described above to generate appropriate state updates.

The method 400 begins at 402 when an instruction to perform a state operation (e.g., read, write, update, delete) is issued from either the projection module 140, the memories module 150, or the decision processing module 170. In addition, at 406, the world model module 160 receives percepts 404 from the input processing module 130 and processes the percepts 404 at 408. For example, the world model module 160 can transform percepts 406 into the world model state representations maintained by the world model module 160 (e.g., through aggregation, filtering, belief revision, etc.), and provide the world model state representations to 408.

At 408, the world model module 160 performs the state operation (e.g., adds, removes, or modifies world state information), and world state information is provided to other modules of the system (i.e., the projection module 140, the memories module 150, and the decision processing module 170).

At 410, the world model module 160 determines whether the state operation (performed at 408) qualifies as an update to memory, and if so, the world model module 160 sends state to the memories module 150 (at 412).

At 414, the world model module 160 determines whether the state operation (performed at 408) is needed to make a decision at the decision processing module 170, and if so, the world model module 160 sends the world state information to the decision processing module 170 (at 416).

At 418, the world model module 160 determines whether the state operation (performed at 408) is required for projection by the projection module 140, and if so, the world model module 160 sends the world state information to the projection module 140 (at 420).

At 422, the world model module 160 analyzes information provided from each of the input processing module 130, projection module 140, the memories module 150, the decision processing module 170, and can then generate and send feedback to any of the other modules (e.g., the input processing module 130, the projection module 140, the memories module 150, the decision processing module 170, and other sub-modules (e.g. the learning module 168)) as appropriate. In addition, as noted above, this feedback information from the world model module 160 can be generated by any of the sub-modules 162, 164, 166, 168, and also stored at the world model module 160 for use by any of the sub-modules 162, 164, 166, 168 of the world model module 160.

At 424, the world model module 160 also receives feedback information from the other modules 130, 140, 160, 170, 180, and processes it (possibly along with other input information) via the learning module 168 (at 426) to perform learning as described above. In general, feedback to the learning module 168 from the other modules 140, 150, 170, indicates the appropriateness of the information type, content, timing, etc. that it's particular first controller module sent, and the all of the feedback provided can influence learning of the learning module 168. For example, in one embodiment, at 426, the learning module 166 of the world model module 160 can process any of these sources of input information, the locally stored information, and/or the feedback information to perform various learning functions and generate transformation parameters (e.g., learns how to perform and improve transformations and the module's I/O). For example, the learning module 166 learns how to improve the module's I/O operations including what to send, where to send, when to send, how often to send, what parts of which inputs to process, etc. In addition, the learning module 166 can also provide the transformation parameters to the symbolic percepts module 162 and the sub-symbolic percepts module 164 so that the symbolic percepts module 162 and the sub-symbolic percepts module 164 can use the transformation parameters to transform inputs into symbolic and sub-symbolic percepts (or representations), and thus improve the I/O and functionality of the world model module 160.

Figure 9:
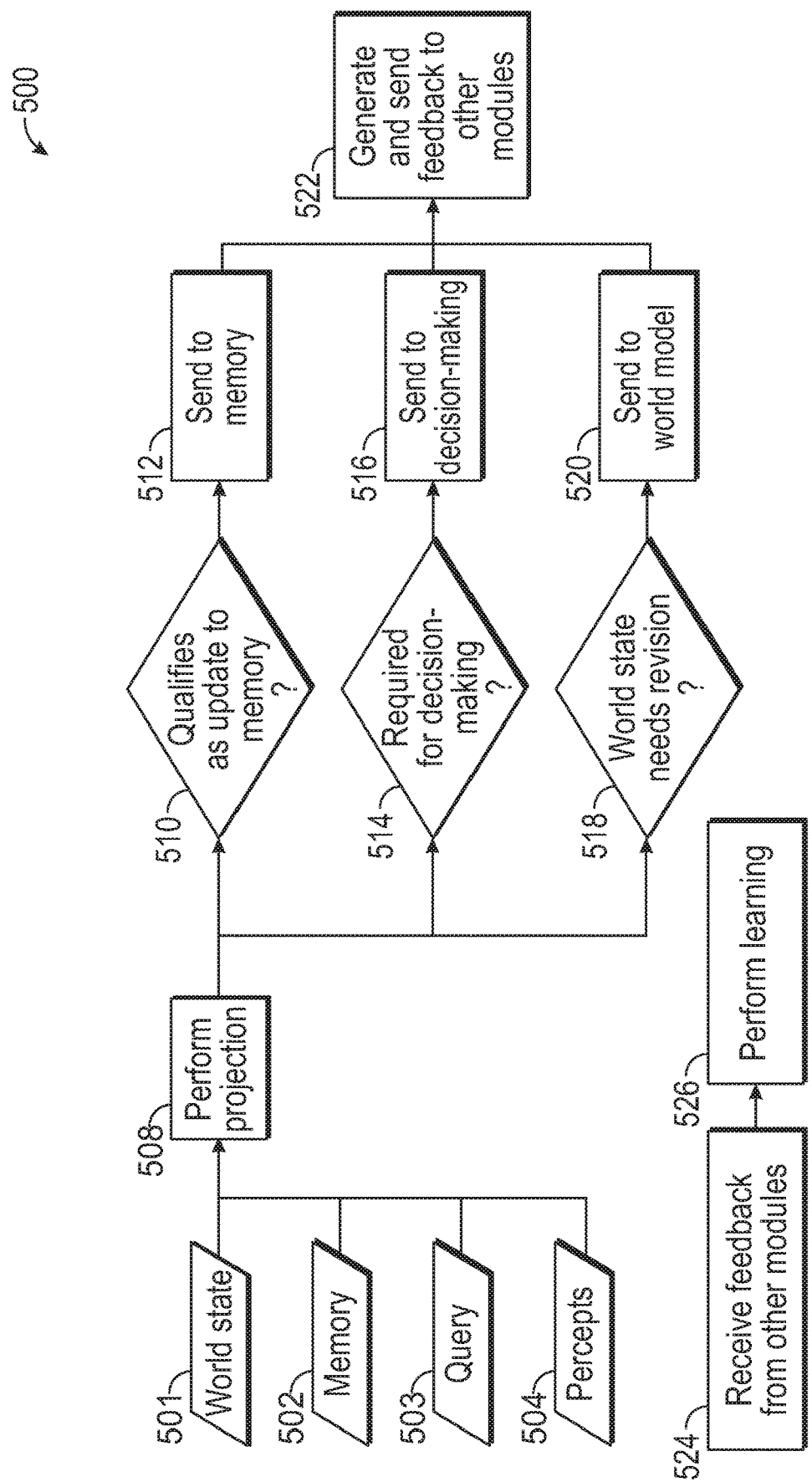
FIG. 9 is a flowchart that shows a method performed by the projection module of FIG. 5 in accordance with various embodiments.

FIG. 9 is a flowchart that shows a method 500 performed by the projection module 140 in accordance with various embodiments. FIG. 9 will be described with continued reference to FIGS. 1-5. As can be appreciated in light of the disclosure, the order of operation within the method 500 is not limited to the sequential execution as illustrated in FIG. 9, but may be performed in one or more varying orders as applicable and in accordance with various embodiments. In various embodiments, the method 500 can be scheduled to run based on one or more predetermined events, and/or can run continuously during operation of the autonomous vehicle 10. In addition, it is also noted that although steps 508-522 and 524-526 are shown in two separate paths, it should be appreciated that steps 508-522 and 524-526 can be performed simultaneously or in parallel. In general terms, steps 512, 516, 520 are performed to obtain information and fill in information gaps that the projection module 140 needs to perform processing tasks such as those described above.

The method 500 begins at 508 when the projection module 140 receives inputs including: world state information 501 from the world model module 160, memory information 502 from the memories module 150, queries 503 from the decision processing module 170, and percepts 504 from the input processing module 130.

Based on the various inputs received, the projection module 140 performs projection processing (at 508) to make projections based on these inputs and generate projection results that are output to other modules. For example, projection results can include projections, and the future state and actions of the environment and the other actors in the world, etc. The projection results can include or be used to generate various outputs including: feedback information that is provided to the input processing module 130, memory operation instructions/information (e.g., read, write, modify, delete) that is provided to the memories module 150, state operation instructions/information (e.g., read, write, update, delete) that is provided to the world model module 160, and projection information that is provided to the decision processing module 170.

At 510, the projection module 140 determines whether projection results qualify as an update to the memories module 150, and if so, the projection module 140 sends memory operation instructions/information (e.g., read, write, modify, delete) to the memories module 150 (at 512). The method 500 then proceeds to 522.

At 514, the projection module 140 determines whether there is a need to make a decision based on the projection results generated at block 508, and if so, the projection module 140 sends the projection information that is provided to the decision processing module 170 (at 516). The method 500 then proceeds to 522.

At 518, the projection module 140 determines whether the projection results generated at block 508 should result in revision(s) at the world model module 160, and if so, the projection module 140 sends state operation instructions/information (e.g., read, write, update, delete) to the world model module 160 (at 520) so that the world model module 160 can process it and take appropriate action. The method 500 then proceeds to 522.

At 522, the projection module 140 analyzes information provided from the input processing module 130, the memories module 150, the world model module 160, and the decision processing module 170, and generates and sends feedback to all of the other modules (e.g., the input processing module 130, the memories module 150, the world model module 160, the decision processing module 170, and other sub-modules (e.g., the learning module 148)) as appropriate. In addition, as noted above, this feedback information from the projection module 140 can be generated by any of the sub-modules 142, 144, 146, 148, and also stored at the projection module 140 for use by any of the sub-modules 142, 144, 146,148 of the projection module 140.

At 524, the projection module 140 also receives feedback information from the other modules including input processing module 130, the memories module 150, the world model module 160, the decision processing module 170, and the control model executor module 180, and processes it (possibly along with other input information) via the learning module 148 (at 526) to perform learning as described above. For example, in one embodiment, at 526, the learning module 148 of the projection module 140 can process any of these sources of input information, the locally stored information, and/or the feedback information to perform various learning functions and generate projection transformation parameters (e.g., learns how to perform and improve transformations and the projection module's I/O). For example, the learning module 148 learns how to improve the projection module's I/O operations including what to send, where to send, when to send, how often to send, what parts of which inputs to process, etc. In addition, the learning module 148 can also provide the projection transformation parameters to the symbolic module 142 and the sub-symbolic module 144 so that the symbolic module 142 and the sub-symbolic module 144 can use the projection transformation parameters to transform inputs into symbolic and sub-symbolic representations, and thus improve the I/O and functionality of the projection module 140

Figure 10:
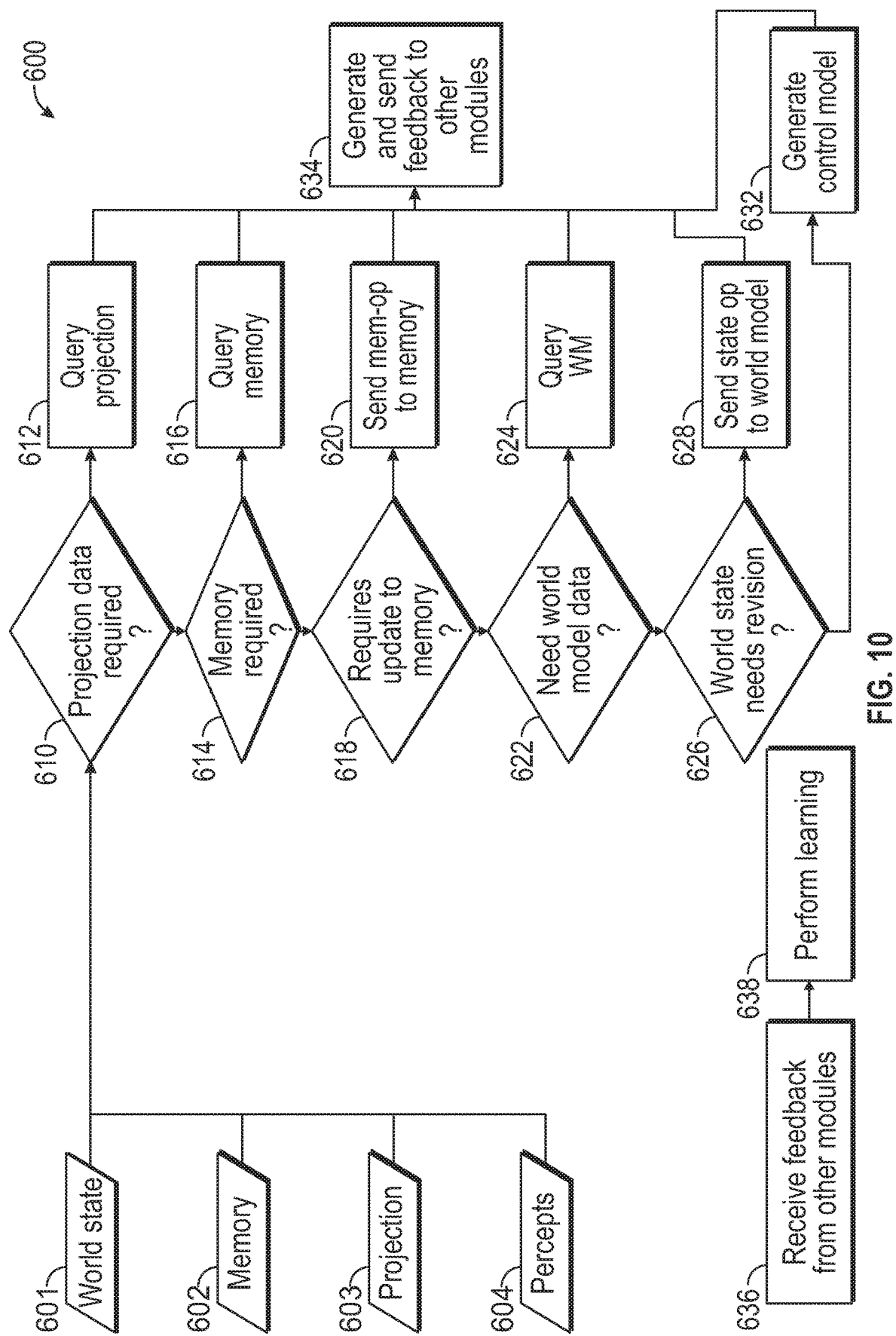
FIG. 10 is a flowchart that shows a method performed by the decision processing module of FIG. 5 in accordance with various embodiments.

FIG. 10 is a flowchart that shows a method 600 performed by the decision processing module 170 in accordance with various embodiments. FIG. 10 will be described with continued reference to FIGS. 1-5. As can be appreciated in light of the disclosure, the order of operation within the method 600 is not limited to the sequential execution as illustrated in FIG. 10, but may be performed in one or more varying orders as applicable and in accordance with various embodiments. For example, although steps 610, 614, 618, 622, and 626 are shown as being performed sequentially for purposes of illustration, but it should be appreciated that steps 610, 614, 618, 622, and 626 can be performed simultaneously or in parallel. In various embodiments, the method 600 can be scheduled to run based on one or more predetermined events, and/or can run continuously during operation of the autonomous vehicle 10. In addition, it is also noted that although steps 610-634 and 636-638 are shown in two separate paths, it should be appreciated that steps 610-634 and 638-638 can be performed simultaneously or in parallel. In general terms, steps 612, 616, 620, 624, 628 are performed to obtain information and fill in information gaps that the decision processing module 170 needs to perform processing tasks such as those described above to make appropriate behavior decisions.

The method 600 begins when the decision processing module 170 receives decision processing inputs including: world state information 601 from the world model module 160, memory information 602 from the memories module 150, projection information 603 from the projection module 140, and the percepts 604 from the input processing module 130. Based on the various decision processing inputs received, the decision processing module 170 performs decision processing (at 610 through 632) to make behavior decisions (at 634), and also to perform learning (at 640) as will be described below.

At 610, the decision processing module 170 determines, based on decision processing inputs 601, 602, 603, 604, whether projection data is required from the projection module 140 to make a behavior decision. For example, in one embodiment, the decision processing module 170 determines (at 610) whether projection data is required from the projection module 140 based on encoded algorithms that weigh the importance of historical, current, and future state of the world and state and actions of the other actors in the world.

When the decision processing module 170 determines (at 610) that projection data is required from the projection module 140 in order to make a behavior decision, the method proceeds to 612, where the decision processing module 170 queries the projection module 140 to obtain the projection data. The method 600 then proceeds to 636.

At 614, the decision processing module 170 determines, based on decision processing inputs 601, 602, 603, 604, whether memories data are required from the memories module 150 to make a behavior decision. When the decision processing module 170 determines (at 614) that memories data are required from the memories module 150 to make a behavior decision, the method proceeds to 616, where the decision processing module 170 queries the memories module 150 to obtain the memories data. The method 600 then proceeds to 636.

At 618, the decision processing module 170 determines, based on the decision processing inputs 601, 602, 603, 604, whether an update to the memories module 150 is required to make a behavior decision. When the decision processing module 170 determines (at 618) that an update to the memories module 150 is required, the method proceeds to 620, where the decision processing module 170 sends memory operation instructions/information (e.g., read, write, modify, delete) to the memories module 150 (at 620). The method 600 then proceeds to 636.

At 622, the decision processing module 170 determines, based on decision processing inputs 601, 602, 603, 604, whether world state information is needed from the world model module 160 to make a behavior decision. When the decision processing module 170 determines (at 622) that world state information is required from the world model module 160 in order to make a behavior decision, the method proceeds to 624, where the decision processing module 170 queries the world model module 160 to obtain the world state information. The method 600 then proceeds to 636.

At 626, the decision processing module 170 determines, based on decision processing inputs 601, 602, 603, 604, whether the decision processing inputs 601, 602, 603, 604 should result in revision(s) at the world model module 160. When the decision processing module 170 determines (at 626) that world model module 160 should be revised in order to make a behavior decision, the method proceeds to 628, where the decision processing module 170 sends state operation instructions/information (e.g., read, write, update, delete) to the world model module 160. The method 600 then proceeds to 636.

At 632, the decision processing module 170 uses the decision processing inputs 601, 602, 603, 604 to make a behavior decision, and the method 600 then proceeds to 636.

At 634, the decision processing module 170 analyzes information provided from the input processing module 130, the projection module 140, the memories module 150, the world model module 160, and generates and sends feedback to all of the other modules (e.g., the input processing module 130, the projection module 140, the memories module 150, the world model module 160, and other sub-modules (e.g. the learning module 158)) as appropriate. In addition, as noted above, this feedback information from the decision processing module 170 can be generated by any of the sub-modules 172, 174, 176, 178 and also stored at the decision processing module 170 for use by any of the sub-modules 172, 174, 176, 178 of the decision processing module 170.

In addition, at 636, the decision processing module 170 also receives feedback information from the other modules including input processing module 130, the projection module 140, the memories module 150, the world model module 160, and processes it (possibly along with other input information) via the learning module 178 (at 638) to perform learning as described above. For example, in one embodiment, at 638, the learning module 178 of the decision processing module 170 can process any of these sources of input information, the locally stored information, and/or the feedback information to perform various learning functions and generate transformation parameters (e.g., learns how to perform and improve transformations and the module's I/O). For example, the learning module 178 learns how to improve the module's I/O operations including what to send, where to send, when to send, how often to send, what parts of which inputs to process, etc. In addition, the learning module 178 can also provide the transformation parameters to the symbolic percepts module 172 and the sub-symbolic percepts module 174 so that the symbolic percepts module 172 and the sub-symbolic percepts module 174 can use the transformation parameters to transform inputs into symbolic and sub-symbolic percepts (or representations), and thus improve the I/O and functionality of the decision processing module 170.

Figure 11:
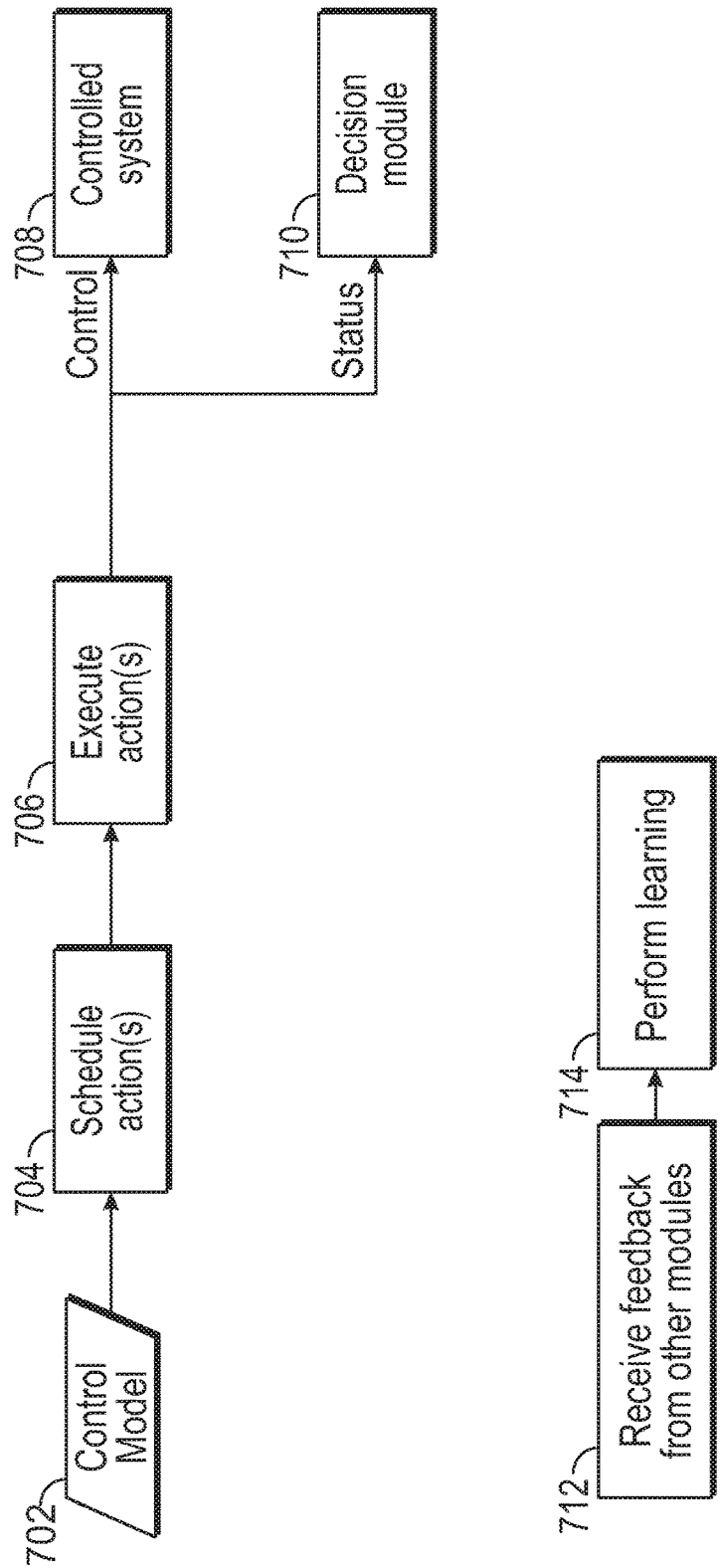
FIG. 11 is a flowchart that shows a method performed by the control model executor module of FIG. 5 in accordance with various embodiments.

FIG. 11 is a flowchart that shows a method 700 performed by the control model executor module 180 in accordance with various embodiments. FIG. 11 will be described with continued reference to FIGS. 1-5. As can be appreciated in light of the disclosure, the order of operation within the method 700 is not limited to the sequential execution as illustrated in FIG. 11, but may be performed in one or more varying orders as applicable and in accordance with various embodiments. In various embodiments, the method 700 can be scheduled to run based on one or more predetermined events, and/or can run continuously during operation of the autonomous vehicle 10. In addition, it is also noted that although steps 704-706 and 712-714 are shown in two separate paths, it should be appreciated that steps 704-706 and 712-714 can be performed simultaneously or in parallel.

The control model executor module 180 can receive control and parameterization from the integration module 176. As described above, the symbolic module 182 can generate a symbolic control model (e.g., a symbolic representation of control actions and constraints) and the sub-symbolic module 184 can generate a sub-symbolic control model (e.g., a sub-symbolic representation of control actions and constraints) that are provided to the integration module 186 and the learning module 188, and the integration module 186 can integrate these inputs to generate a control model that includes control actions and constraints that provide for invocation of capabilities of the low-level controller 80.

The method 700 begins at 704, where the control model executor module 180 performs processing, based on 702, to schedule action(s) to be performed. At 706, the control model executor module 180 performs processing to execute the control model and generate control signals that are provided (at 708) to a controlled system, which in this case is the low-level controller 80 (FIGS. 4 and 5), and status information that is provided to a decision module 710.

In addition, at 712, the control model executor module 180 also receives, via the decision processing module 170, feedback information from the other modules (e.g., the input processing module 130, the projection module 140, the memories module 150, the world model module 160, and the decision processing module 170), and processes the feedback information via the learning module 188 (at 714) to perform learning as described above. For example, in one embodiment, at 714, the learning module 188 of the control model executor module 180 can process any of these sources of input information, the locally stored information, and/or the feedback information to perform various learning functions and generate transformation parameters (e.g., learns how to perform and improve transformations and the module's I/O). For example, the learning module 188 learns how to improve the control model executor module's I/O operations including what to send, where to send, when to send, how often to send, what parts of which inputs to process, etc. In addition, the learning module 188 can also provide the transformation parameters to the symbolic percepts module 182 and the sub-symbolic percepts module 184 so that the symbolic percepts module 182 and the sub-symbolic percepts module 184 can use the transformation parameters to transform inputs into symbolic and sub-symbolic percepts (or representations), and thus improve the I/O and functionality of the control model executor module 180.

As such, the disclosed embodiments intelligently combine symbolic, connectionist and cognitive AI technologies with rule-based procedural logic to enable behavioral decision-making and solve complex autonomous vehicle driving tasks in real-time. The disclosed embodiments combine heuristic, symbolic and connectionist cognitive approaches to cover the entire autonomous driving operation space. One benefit of he disclosed embodiments is that they can help improve the speed of execution by use of distributed modules, asynchronous communications, and distinct control executor allow for reactive, real-time decision-making and action even while performing deep sensor processing and deliberative reasoning. In addition, use of CPU and memory resources is improved because the disclosed embodiments can allow for introspective computations, which helps prevent unbounded memory or CPU requirements. As will be explained with reference to FIG. 12, the disclosed embodiments can provide a hybrid paradigm that employs a number of different modules 130, 140, 150, 160, 170, 180 that interact with each other to realize the characteristics needed for level 5 autonomous driving.

FIG. 12 is a table that explains how modules 130, 140, 150, 160, 170, 180 of the control system 100 (that are described with reference to FIGS. 4-11) can provide various characteristics needed for Level Five automation. In general, this combination of different modules 130, 140, 150, 160, 170, 180 can allow the disclosed embodiments to mimic naturalistic human-like behaviors. The projection module 140, world model module 160, and decision processing module 170 of the disclosed embodiments can provide exhaustive domain coverage (e.g., provable state space and action space coverage).

Each module 130, 140, 150, 160, 170, 180 of the controller 90 includes symbolic and sub-symbolic modules that can be used to generate symbolic and sub-symbolic representations. The symbolic and sub-symbolic modules allow for complex reasoning because they can provide expressive representations and generic algorithms. The use of symbolic and sub-symbolic representations in conjunction with reasoning provided by projections from the projection module 140, the memories data from the memories module 150, state provided from the world model module 160, and the real-time control model executor module 180 can collectively provide deliberative through to reactive characteristics, and used to solve highly complex domain problems while obeying real-time requirements.

The projection module 140 is predictive and supports representing and reasoning over future states and actions. As such, the disclosed embodiments also facilitate deliberative and predictive capabilities. For example, the system can form and project representations about the driving world, other agents and entities in a driving scene.

The disclosed embodiments can use data-driven, model-driven and goal-driven learning at the same time. The learning modules 136, 148, 158, 168, 178, 188 that are provided within each module of the controller 90 can provide active learning at all modules 130, 140, 150, 160, 170, 180 and allow the system 100 to be adaptive based on experience. Further, providing sub-symbolic modules 134, 144, 154, 164, 174, 184 and learning modules 136, 148, 158, 168, 178, 188 at each of the module 130, 140, 150, 160, 170, 180 of the controller 90 can provide capability to deal with incomplete and uncertain information, and thus enables complex decision making even under uncertainty.

Explicit symbolic representations can help provide explainable outputs that support validation, and allow for flexible representation and algorithms that do not need complete retraining for knowledge addition. This can make it easy to modify domain knowledge.

In addition, providing feedback between all modules 130, 140, 150, 160, 170, 180 and sub-modules that make up those modules 130, 140, 150, 160, 170, 180 enables the system to adapt based on experience.

The use of distinct symbolic and sub-symbolic representations 142, 144, 152, 154, 162, 164, 172, 174 enable multi-hypothesis robustness.

The incorporation of projection 140 enables the ability to reason over wide range of timescales while remaining reactive because of 180.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a vehicle, the method comprising:

generating control signals at a high-level controller based on one or more sources of input data, comprising at least one of: sensors that provide sensor output information, map data and goals, wherein the high-level controller comprises first controller modules comprising: an input processing module, a projection module, a memories module, a world model module, and a decision processing module that comprises a control model executor module, and wherein the generating control signals comprises:

generating, at the input processing module based on the input data, symbolic and sub-symbolic percepts;

generating, at the memories module based on the symbolic and sub-symbolic percepts, memories data, state operations and first feedback information that is provided to each of the other first controller modules;

generating, at the world model module based on the symbolic and sub-symbolic percepts, world state information that indicates state of other entities in an external environment of the vehicle and includes information regarding current attributes of objects in the external environment of the vehicle, and second feedback information that is provided to each of the other first controller modules;

generating, at the decision processing module based on the symbolic and sub-symbolic percepts, queries, state operations, memory operations, a control model comprising control actions and constraints and third feedback information that is provided to each of the other first controller modules;

processing, at the projection module, projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules;

generating the control signals at the control model executor module by executing the control model, wherein the control signals specify control actions and parameters used to schedule the one or more scheduled actions to be performed to automate driving tasks; and processing the control signals, at a low-level controller, to generate commands that control a plurality of vehicle actuators of the vehicle in accordance with the control signals to execute one or more scheduled actions to be performed to automate driving tasks.

2. A method according to claim 1, wherein generating, at the input processing module based on the input data, the symbolic and sub-symbolic percepts, comprises:

processing first learning inputs to generate input transformation parameters, the first learning inputs comprising: the input data, the symbolic percepts, the sub-symbolic percepts, feedback information from each of the other first controller modules, and input processing control information from the decision processing module, wherein the input processing control information comprises commands and parameterization;

sending the input transformation parameters to a symbolic percepts module of the input processing module and a sub-symbolic percepts module of the input processing module;

processing, at the symbolic percepts module, the input data, the input transformation parameters, the input processing control information from the decision processing module, and feedback information from each of the other first controller modules to transform the input data into the symbolic percepts, wherein the symbolic percepts are symbolic representations comprising at least one of: labels, predicates, and logical expressions; and processing, at the sub-symbolic percepts module, the input data, the input transformation parameters, the input processing control information from the decision processing module, and feedback information from each of the other first controller modules to transform the input data into the sub-symbolic percepts, wherein the sub-symbolic percepts are sub-symbolic representations comprising at least one of: probability distributions, activation levels, and confidence levels.

3. A method according to claim 1, wherein the projection inputs comprise: the symbolic percepts and the sub-symbolic percepts from the input processing module, the memories data and the first feedback information from the memories module, the world state information and the second feedback information from the world model module, and the queries and the third feedback information from the decision processing module, and wherein processing, at the projection module, the projection inputs, comprises:

performing, at a first symbolic module, symbolic projection processing to transform the projection inputs into symbolic representations and generate symbolic projections;

performing, at a first sub-symbolic module, sub-symbolic projection processing to transform the projection inputs into sub-symbolic representations and generate sub-symbolic projections;

integrating the symbolic projections and the sub-symbolic projections to generate the projections, the memory operations that are sent to the memories module to update the memories module, the state operations that are sent to the world model module to make revisions at the world model module, the projections that are sent to the decision processing module to make a behavior decision at the decision processing module, and the fourth feedback information; and wherein each of the memory operations comprises a command to either: query the memories module to read memories data from the memories module, write memories data to the memories module, delete memories data from the memories module, or modify memories data stored at the memories module, and wherein each of the state operations comprises a command to either: query the world model module to read world state information from the world model module, write world state information to the world model module, delete world state information from the world model module, or modify world state information at the world model module, and wherein the projections provided to the decision processing module comprise at least one of: future predicted activity and state of other entities in the external environment of the vehicle; and the method further comprising:

processing second learning inputs to generate projection transformation parameters that are used by the projection module to improve input/output of the projection module and functionality of each module of the projection module, wherein the second learning inputs comprise: the symbolic percepts and the sub-symbolic percepts from the input processing module, the memories data from the memories module, the world state information from the world model module, the queries from the decision processing module, the symbolic projections from the first symbolic module, the sub-symbolic projections from the first sub-symbolic module, and the projections from the first integration module.

4. A method according to claim 1, wherein generating, at the memories module based on the symbolic and sub-symbolic percepts, the memories data, the state operations and the first feedback information that is provided to each of the other first controller modules, comprises:

processing the symbolic percepts and the sub-symbolic percepts, the memory operations from the projection module, the world state information from the world model module, and the memory operations from the decision processing module to generate the memories data, the state operations and the first feedback information that is provided to each of the other first controller modules; and the method further comprising:

sending the memories data to the projection module and the decision processing module, wherein the memories data comprise: historical information that captures historical data of potential importance;

sending the state operations to the world model module, wherein each of the state operations comprises a command to either: query the world model module to read world state information from the world model module, write world state information to the world model module, delete world state information from the world model module, or modify world state information at the world model module.

5. A method according to claim 4, wherein generating, at the memories module based on the symbolic and sub-symbolic percepts, the memories data, the state operations and the first feedback information that is provided to each of the other first controller modules, further comprises:
performing symbolic memory processing, at a second symbolic module, to transform memories input information into symbolic representations and generate symbolic memories, wherein the memories input information comprises: the symbolic percepts and the sub-symbolic percepts from the input processing module, the memory operations from the projection module, the world state information from the world model module, the memory operations from the decision processing module, and memory transformation parameters;
performing sub-symbolic memory processing, at a second sub-symbolic module, to transform the memories input information into sub-symbolic representations and generate sub-symbolic memories; and
integrating second integration inputs, at a second integration module, to generate the second feedback information, the memories data that are sent to the projection module, the state operations that are sent to the world model module, and the memories data that are sent to the decision processing module, wherein the second integration inputs comprise: the symbolic memories, the sub-symbolic memories, and the memory transformation parameters; and
the method further comprising:
generating the memory transformation parameters at a second learning module based on third learning inputs, wherein the third learning inputs comprise: the symbolic memories, the sub-symbolic memories, the memory operations from the projection module, the world state information from the world model module, the memory operations from the decision processing module, and the memories data from the second integration module; and
sending the memory transformation parameters to the second symbolic module and the second sub-symbolic module for processing to improve input/output of the memories module and functionality of each module of the memories module.

6. A method according to claim 1, wherein generating, at the world model module based on the symbolic and sub-symbolic percepts, the world state information, and the second feedback information that is provided to each of the other first controller modules, comprises:
processing world model input information to generate the:
the second feedback information that is provided to each of the other first controller modules; and the world state information that is provided to the projection module, the memories module, and the decision processing module,
wherein the world model input information comprises: the symbolic percepts, the sub-symbolic percepts, and the state operations from the projection module, the memories module, and the decision processing module.

7. A method according to claim 6, wherein the world model input information further comprises world model transformation parameters, and wherein generating, at the world model module based on the symbolic and sub-symbolic percepts, the world state information, and the second feedback information that is provided to each of the other first controller modules, further comprises:
performing symbolic world model processing, at a third symbolic module, to transform the world model input information into symbolic representations and generate symbolic world state information;
performing sub-symbolic world model processing, at a third sub-symbolic module, to transform the world model input information into sub-symbolic representations and generate sub-symbolic world state information;
integrating, at a third integration module, the symbolic world state information and the sub-symbolic world state information to generate: the world state information, the second feedback information that is provided to each of the other first controller modules, and the world state information that is sent to the projection module, the memories module, and the decision processing module; and
the method further comprising:
generating, at a third learning module based on fourth learning inputs, the world model transformation parameters, wherein the fourth learning inputs comprise: the symbolic percepts and the sub-symbolic percepts, the state operations from the projection module, the memories module, and the decision processing module, the symbolic world state information, the sub-symbolic world state information, and the world state information from the integration module; and
sending the world model transformation parameters to the third symbolic module and the third sub-symbolic module for processing to improve input/output of the world model module and functionality of each module of the world model module.

8. A method according to claim 1, wherein the generating, at the decision processing module based on the symbolic and sub-symbolic percepts, the queries, the state operations, the memory operations, the control model, and the third feedback information that is provided to each of the other first controller modules, comprises:
processing decision processing inputs to determine a behavior decision that comprises the one or more scheduled actions to be performed to automate the driving tasks and generate the queries, the state operations, the memory operations, the control model, and the third feedback information that is provided to each of the other first controller modules, wherein the decision processing inputs comprising: the symbolic percepts and the sub-symbolic percepts, the projection information from the projection module, the memories data from the memories module, and the world state information from the world model module; and
the method further comprising:
sending the queries to the projection module, wherein each query sent to the projection module comprises: a request for projection data from the projection module that is required to make the behavior decision;
sending the memory operations to the memories module, wherein each memory operation comprises a command to either: query the memories module to read memories data from the memories module that are required to make the behavior decision, write memories data to the memories module as required to make the behavior decision, delete memories data from the memories module as required to make the behavior decision, or modify memories data at the memories module as required to make the behavior decision; and sending the state operations to the world model module, wherein each state operation comprises a command to either: query the world model module to read world state information from the world model module that is required to make the behavior decision, write world state information to the world model module that is required to make the behavior decision, delete world state information from the world model module as required to make the behavior decision, or modify world state information at the world model module as required to make the behavior decision.

9. A method according to claim 8, wherein generating, at the decision processing module based on the symbolic and sub-symbolic percepts, the queries, the state operations, the memory operations, the control model, and the third feedback information that is provided to each of the other first controller modules, further comprises:

performing symbolic decision-making processing, at a fourth symbolic module, to transform decision processing inputs into symbolic representations and generate symbolic decision-making processing results comprising one or more of actions, action parameters and constraints;

performing sub-symbolic decision-making processing, at a fourth sub-symbolic module, to transform the decision processing inputs into sub-symbolic representations and generate sub-symbolic decision-making processing results comprising one or more of actions, action parameters and constraints, and wherein the decision processing inputs comprise: the symbolic percepts and the sub-symbolic percepts from the input processing module, the projection information from the projection module, the memories data from the memories module, the world state information from the world model module, and decision processing transformation parameters; and integrating, at a fourth integration module, the symbolic decision-making processing results and the sub-symbolic decision-making processing results to generate:

decision-processing results, wherein the decision-processing results comprise: the control model, the third feedback information that is provided to each of the other first controller modules, the queries that are sent to the projection module, the memory operations that are sent to the memories module, and the state operations that are sent to the world model module; and the method further comprising:

generating the decision processing transformation parameters, at a fourth learning module, based on fifth learning inputs comprising: the symbolic percepts and the sub-symbolic percepts from the input processing module, the projection information from the projection module, the memories data from the memories module, and the world state information from the world model module; and sending the decision processing transformation parameters to the fourth symbolic module and the fourth sub-symbolic module for processing to improve input/output of the decision processing module and functionality of each module of the decision processing module.

10. A method according to claim 9, wherein generating, at the control model executor module based on the control model provided from the decision processing module, the control signals that are provided to the low-level controller comprises:

performing symbolic control model processing, at a fifth symbolic module, to transform the control model into symbolic representations and generate a symbolic control model that comprises a symbolic representation of the control actions and constraints; and performing sub-symbolic control model processing, at a fifth sub-symbolic module, to transform the control model into sub-symbolic representations and generate a sub-symbolic control model that comprises a sub-symbolic representation of the control actions and constraints;

integrating, a fifth integration module, the symbolic control model and the sub-symbolic control model to generate the control signals that specify the control actions and parameters that are sent to the low-level controller, wherein the control actions and parameters provide for invocation of capabilities of the low-level controller to schedule the one or more scheduled actions to be performed to automate the driving tasks;

the method further comprising:

generating control model transformation parameters, at a fifth learning module, based on sixth learning inputs comprising: the symbolic control model, the sub-symbolic control model, and the control signals from the fifth integration module; and sending the control model transformation parameters to the fifth symbolic module and the fifth sub-symbolic module for processing to improve input/output of the control model executor module and functionality of each module of the control model executor module.

11. A method according to claim 1, wherein feedback information sent to a particular first controller module by another first controller module comprises at least one of:

information content related to a prior interaction with that particular first controller module that indicates appropriateness or inappropriateness of information received from that particular first controller module; and information regarding timeliness of the prior interaction with that particular first controller module.

12. A method according to claim 1, wherein feedback information sent to a particular first controller module by another first controller module comprises at least one of:

a signal of positive reaction to a prior interaction with that particular first controller module that provides positive reinforcement information that influences adjustment of processing at that particular first controller module for processing to improve input/output and performance of that particular first controller module; and a signal of negative reaction to the prior interaction with that particular first controller module that provides negative reinforcement information that influences adjustment of processing at that particular first controller module for processing to improve input/output and performance of that particular first controller module.

13. A vehicle control system, comprising:

one or more sources of input data, comprising at least one of: sensors that provide sensor output information, map data and goals;

a low-level controller configured to process control signals to generate commands that control a plurality of vehicle actuators of a vehicle in accordance with the control signals to execute one or more scheduled actions to be performed to automate driving tasks; and a high-level controller comprising a plurality of first controller modules, and being configured to generate the control signals, wherein the first controller modules of the high-level controller comprise:
an input processing module configured to generate symbolic and sub-symbolic percepts based on the input data;
a memories module configured to generate, based on the symbolic and sub-symbolic percepts, memories data, state operations and first feedback information that is provided to each of the other first controller modules;
a world model module configured to generate, based on the symbolic and sub-symbolic percepts, world state information that indicates state of other entities in an external environment of the vehicle and includes information regarding current attributes of objects in the external environment of the vehicle, and second feedback information that is provided to each of the other first controller modules;
a decision processing module configured to generate, based on the symbolic and sub-symbolic percepts, queries, state operations, memory operations, a control model comprising control actions and constraints, and third feedback information that is provided to each of the other first controller modules; and
a projection module configured to: process projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules, and wherein the decision processing module comprises:
a control model executor module that is configured to: generate, by executing the control model, the control signals that are provided to the low-level controller, wherein the control signals specify control actions and parameters used to schedule the one or more scheduled actions to be performed to automate driving tasks.

14. A vehicle control system according to claim 13, wherein the input processing module comprises:
a symbolic percepts module that is configured to generate the symbolic percepts based on the input data and input transformation parameters, and wherein the symbolic percepts are symbolic representations comprising at least one of: labels, predicates, and logical expressions;
a sub-symbolic percepts module that is configured to generate the sub-symbolic percepts based on the input data and the input transformation parameters, and wherein the sub-symbolic percepts are sub-symbolic representations comprising at least one of: probability distributions, activation levels, and confidence levels, and
an input learning module configured to:
process first learning inputs to generate the input transformation parameters, the first learning inputs comprising: the input data, the symbolic percepts, the sub-symbolic percepts, feedback information from each of the other first controller modules, and input processing control information from the decision processing module, wherein the input processing control information comprises commands and parameterization; and
send the input transformation parameters to the symbolic percepts module and the sub-symbolic percepts module, wherein the input transform parameters are used by the symbolic percepts module and the sub-symbolic percepts module to transform the input data into the symbolic percepts and sub-symbolic percepts.

15. A vehicle control system according to claim 13, wherein the projection inputs comprise: the symbolic percepts and the sub-symbolic percepts from the input processing module, the memories data and the first feedback information from the memories module, the world state information and the second feedback information from the world model module, and the queries and the third feedback information from the decision processing module, and wherein the projection module comprises:
a first symbolic module configured to: perform symbolic projection processing to transform the projection inputs into symbolic representations and generate symbolic projections;
a first sub-symbolic module configured to: perform sub-symbolic projection processing to transform the projection inputs into sub-symbolic representations and generate sub-symbolic projections;
a first integration module configured to:
receive first integration inputs comprising: the symbolic projections, the sub-symbolic projections; and
integrate the symbolic projections and the sub-symbolic projections to generate: the projections, the memory operations that are sent to the memories module to update the memories module, the state operations that are sent to the world model module to make revisions at the world model module, the projections that are sent to the decision processing module to make a behavior decision at the decision processing module, and the fourth feedback information,
wherein each of the memory operations comprises a command to either: query the memories module to read memories data from the memories module, write memories data to the memories module, delete memories data from the memories module, or modify memories data stored at the memories module, and wherein each of the state operations comprises a command to either: query the world model module to read world state information from the world model module, write world state information to the world model module, delete world state information from the world model module, or modify world state information at the world model module, and wherein the projections provided to the decision processing module comprise at least one of: future predicted activity and state of other entities in the external environment of the vehicle; and
a first learning module configured to:
receive second learning inputs comprising: the symbolic percepts and the sub-symbolic percepts from the input processing module, the memories data from the memories module, the world state information from the world model module, the queries from the decision processing module, the symbolic projections from the first symbolic module, the sub-symbolic projections from the first sub-symbolic module, and the projections from the first integration module;

generate, based on one or more of the second learning inputs, projection transformation parameters; and send the projection transformation parameters to the first symbolic module and the first sub-symbolic module for processing to improve input/output of the projection module and functionality of each module of the projection module.

16. A vehicle control system according to claim 13, wherein each of the memory operations comprises a command to either: query the memories module to read memories data from the memories module, write memories data to the memories module, delete memories data from the memories module, or modify memories data stored at the memories module, and wherein the memories module comprises:

a second symbolic module configured to: receive memories input information comprising: the symbolic percepts and the sub-symbolic percepts from the input processing module, the memory operations from the projection module, the world state information from the world model module, the memory operations from the decision processing module, and memory transformation parameters; and perform symbolic memory processing to transform the memories input information into symbolic representations and generate symbolic memories;

a second sub-symbolic module configured to: receive the memories input information; and perform sub-symbolic memory processing to transform the memories input information into sub-symbolic representations and generate sub-symbolic memories;

a second integration module configured to:
  receive second integration inputs comprising: the symbolic memories, the sub-symbolic memories, and memory transformation parameters; and
  integrate the second integration inputs to generate the second feedback information, the memories data that are sent to the projection module, the state operations that are sent to the world model module, and the memories data that are sent to the decision processing module;
  send the memories data to the projection module and the decision processing module, wherein the memories data comprise: historical information that captures historical data of potential importance;
  send the state operations to the world model module, wherein each of the state operations comprises a command to either: query the world model module to read world state information from the world model module, write world state information to the world model module, delete world state information from the world model module, or modify world state information at the world model module; and a second learning module configured to:
  receive third learning inputs comprising: the symbolic memories, the sub-symbolic memories, the memory operations from the projection module, the world state information from the world model module, the memory operations from the decision processing module, and the memories data from the second integration module; and
  generate, based on one or more of the third learning inputs, the memory transformation parameters; and
  send the memory transformation parameters to the second symbolic module and the second sub-symbolic module for processing to improve input/output of the memories module and functionality of each module of the memories module.

17. A vehicle control system according to claim 13, wherein the world model module is further configured to: receive world model input information comprising: the symbolic percepts and the sub-symbolic percepts from the input processing module, and the state operations from the projection module, the memories module, and the decision processing module, and world model transformation parameters; and wherein the world model module comprises:
  a third symbolic module configured to: perform symbolic world model processing to transform the world model input information into symbolic representations and generate symbolic world state information;
  a third sub-symbolic module configured to: perform sub-symbolic world model processing to transform the world model input information into sub-symbolic representations and generate sub-symbolic world state information;
  a third integration module configured to:
    receive third integration inputs comprising: the symbolic world state information from symbolic module, the sub-symbolic world state information from sub-symbolic module, and world model transformation parameters; and
    integrate the symbolic world state information and the sub-symbolic world state information to generate the world state information, the second feedback information, and the world state information that is sent to the projection module, the memories module, and the decision processing module; and
  a third learning module configured to:
    receive fourth learning inputs comprising: the symbolic percepts and the sub-symbolic percepts, the state operations from the projection module, the state operations from the memories module, the state operations from the decision processing module, the symbolic world state information from the third symbolic module, the sub-symbolic world state information from the third sub-symbolic module, and the world state information from the integration module;
    generate, based on the fourth learning inputs, world model transformation parameters; and
    send the world model transformation parameters to the third symbolic module and the third sub-symbolic module for processing to improve input/output of the world model module and functionality of each module of the world model module.

18. A vehicle control system according to claim 13, wherein the decision processing module is further configured to:
  receive decision processing inputs comprising: the symbolic percepts and the sub-symbolic percepts from the input processing module, the projection information from the projection module, the memories data from the memories module, and the world state information from the world model module;
  process the decision processing inputs to determine a behavior decision that comprises the one or more scheduled actions to be performed to automate driving tasks and generate the queries, the state operations, the memory operations, the control model and the third feedback information that is provided to each of the other first controller modules;

send the queries to the projection module, wherein each query sent to the projection module comprises a request for projection data from the projection module that is required to make the behavior decision;

send the memory operations to the memories module, wherein each memory operation comprises a command to either: query the memories module to read memories data from the memories module that are required to make the behavior decision, write memories data to the memories module as required to make the behavior decision, delete memories data from the memories module as required to make the behavior decision, or modify memories data at the memories module as required to make the behavior decision; and send the state operations to the world model module, wherein each state operation comprises a command to either: query the world model module to read world state information from the world model module that is required to make the behavior decision, write world state information to the world model module that is required to make the behavior decision, delete world state information from the world model module as required to make the behavior decision, or modify world state information at the world model module as required to make the behavior decision.

19. A vehicle control system according to claim 18, wherein the decision processing module comprises:

a fourth symbolic module configured to:
receive decision processing inputs comprising: the symbolic percepts and the sub-symbolic percepts from the input processing module, the projection information from the projection module, the memories data from the memories module, the world state information from the world model module, and decision processing transformation parameters; and perform symbolic decision-making processing to transform the decision processing inputs into symbolic representations and generate symbolic decision-making processing results, wherein the symbolic decision-making processing results comprise one or more of actions, action parameters and constraints;

a fourth sub-symbolic module configured to: perform sub-symbolic decision-making processing to transform the decision processing inputs into sub-symbolic representations and generate sub-symbolic decision-making processing results, wherein the sub-symbolic decision-making processing results comprise one or more of actions, action parameters and constraints; and a fourth integration module configured to:
receive fourth integration inputs comprising: the symbolic decision-making processing results, the sub-symbolic decision-making processing results, and the decision processing transformation parameters; and integrate the symbolic decision-making processing results and the sub-symbolic decision-making processing results to generate: decision-processing results, wherein the decision-processing results comprise: the control model, the third feedback information, the queries that are sent to the projection module, the memory operations that are sent to the memories module, and the state operations that are sent to the world model module; and a fourth learning module configured to:
receive fifth learning inputs comprising: the symbolic percepts and the sub-symbolic percepts from the input processing module, the projection information from the projection module, the memories data from the memories module, and the world state information from the world model module; and generate, based on one or more of the fifth learning inputs, the decision processing transformation parameters; and send the decision processing transformation parameters to the fourth symbolic module and the fourth sub-symbolic module for processing to improve input/output of the decision processing module and functionality of each module of the decision processing module;

wherein the control model executor module comprises:
a fifth symbolic module configured to:
perform symbolic control model processing to transform the control model input information into symbolic representations and generate a symbolic control model that comprises a symbolic representation of the control actions and constraints;

a fifth sub-symbolic module configured to: perform sub-symbolic control model processing to transform the control model input information into sub-symbolic representations and generate a sub-symbolic control model that comprises a sub-symbolic representation of the control actions and constraints;

a fifth integration module configured to: integrate the symbolic control model and the sub-symbolic control model to generate of the control signals that specify the control actions and parameters that are sent to the low-level controller, wherein the control actions and parameters provide for invocation of capabilities of the low-level controller to schedule the one or more scheduled actions to be performed to automate the driving tasks;

a fifth learning module configured to:
receive sixth learning inputs comprising: the symbolic control model, the sub-symbolic control model, and the control signals and from the fifth integration module;

generate, based on the sixth learning inputs, control model transformation parameters; and send the control model transformation parameters to the fifth symbolic module and the fifth sub-symbolic module for processing to improve input/output of the control model executor module and functionality of each module of the control model executor module.

20. A high-level controller configured to generate control signals that are used to generate commands that control a plurality of vehicle actuators of a vehicle to execute one or more scheduled actions to be performed to automate driving tasks, the high-level controller comprising:

a plurality of first controller modules, comprising:
an input processing module configured to generate symbolic and sub-symbolic percepts based on one or more sources of input data, comprising at least one of: sensors that provide sensor output information, map data and goals;

a memories module configured to generate, based on the symbolic and sub-symbolic percepts, memories data, state operations and first feedback information that is provided to each of the other first controller modules;

a world model module configured to generate, based on the symbolic and sub-symbolic percepts, world state information that indicates state of other entities in an external environment of the vehicle and includes information regarding current attributes of objects in the external environment of the vehicle, and second feedback information that is provided to each of the other first controller modules; and a decision processing module configured to generate, based on the symbolic and sub-symbolic percepts, queries, state operations, memory operations, a control model comprising control actions and constraints, and third feedback information that is provided to each of the other first controller modules;

a projection module configured to: process projection inputs to generate: memory operations that are sent to the memories module to update the memories module; state operations that are sent to the world model module to make revisions at the world model module; projections that are used to make a behavior decision at the decision processing module; and fourth feedback information that is provided to each of the other first controller modules, and wherein the decision processing module comprises:

a control model executor module that is configured to: generate, by executing the control model, the control signals, wherein the control signals specify control actions and parameters used to schedule the one or more scheduled actions to be performed to automate driving tasks.

* * * * *